| INPUTS | | | | | | OUTPUTS | | | |
|---|---|---|---|---|---|---|---|---|---|
| S | R | ST | RT | SS | RS | "1"$_N$ | "1"$_{N+1}$ | "0"$_N$ | "0"$_{N+1}$ |
| 0 | 1 | PULSE MAY BE PRESENT OR ABSENT | | MAY BE EITHER 0 OR 1 | | 0 | 0 | 1 | 1 |
| | | | | | | 1 | 0 | 0 | 1 |
| 1 | 0 | | | | | 0 | 1 | 1 | 0 |
| | | | | | | 1 | 1 | 0 | 0 |
| 1 | 1 | | | | | 0 | 0 | 1 | 0 |
| | | | | | | 1 | 0 | 0 | 0 |
| 0 | 0 | PULSE ABSENT | PULSE ABSENT | 0 | 0 | 0 | 0 | 1 | 1 |
| | | | | | | 1 | 1 | 0 | 0 |
| 0 | 0 | | | 0 | 1 | 0 | 0 | 1 | 1 |
| | | | | | | 1 | 1 | 0 | 0 |
| 0 | 0 | | | 1 | 0 | 0 | 0 | 1 | 1 |
| | | | | | | 1 | 1 | 0 | 0 |
| 0 | 0 | | | 1 | 1 | 0 | 0 | 1 | 1 |
| | | | | | | 1 | 1 | 0 | 0 |
| 0 | 0 | PULSE PRESENT | PULSE PRESENT | 0 | 0 | 0 | — | 1 | — |
| | | | | | | 1 | — | 0 | — |
| 0 | 0 | | | 0 | 1 | 0 | 1 | 1 | 0 |
| | | | | | | 1 | 1 | 0 | 0 |
| 0 | 0 | | | 1 | 0 | 0 | 0 | 1 | 1 |
| | | | | | | 1 | 0 | 0 | 1 |
| 0 | 0 | | | 1 | 1 | 0 | 0 | 1 | 1 |
| | | | | | | 1 | 1 | 0 | 0 |
| 0 | 0 | PULSE ABSENT | PULSE PRESENT | 0 | 0 | 0 | 0 | 1 | 1 |
| | | | | | | 1 | 0 | 0 | 1 |
| 0 | 0 | | | 0 | 1 | 0 | 0 | 1 | 1 |
| | | | | | | 1 | 1 | 0 | 0 |
| 0 | 0 | | | 1 | 0 | 0 | 0 | 1 | 1 |
| | | | | | | 1 | 0 | 0 | 1 |
| 0 | 0 | | | 1 | 1 | 0 | 0 | 1 | 1 |
| | | | | | | 1 | 1 | 0 | 0 |
| 0 | 0 | PULSE PRESENT | PULSE ABSENT | 0 | 0 | 0 | 1 | 1 | 0 |
| | | | | | | 1 | 1 | 0 | 0 |
| 0 | 0 | | | 0 | 1 | 0 | 1 | 1 | 0 |
| | | | | | | 1 | 1 | 0 | 0 |
| 0 | 0 | | | 1 | 0 | 0 | 0 | 1 | 1 |
| | | | | | | 1 | 1 | 0 | 0 |
| 0 | 0 | | | 1 | 1 | 0 | 0 | 1 | 1 |
| | | | | | | 1 | 1 | 0 | 0 |

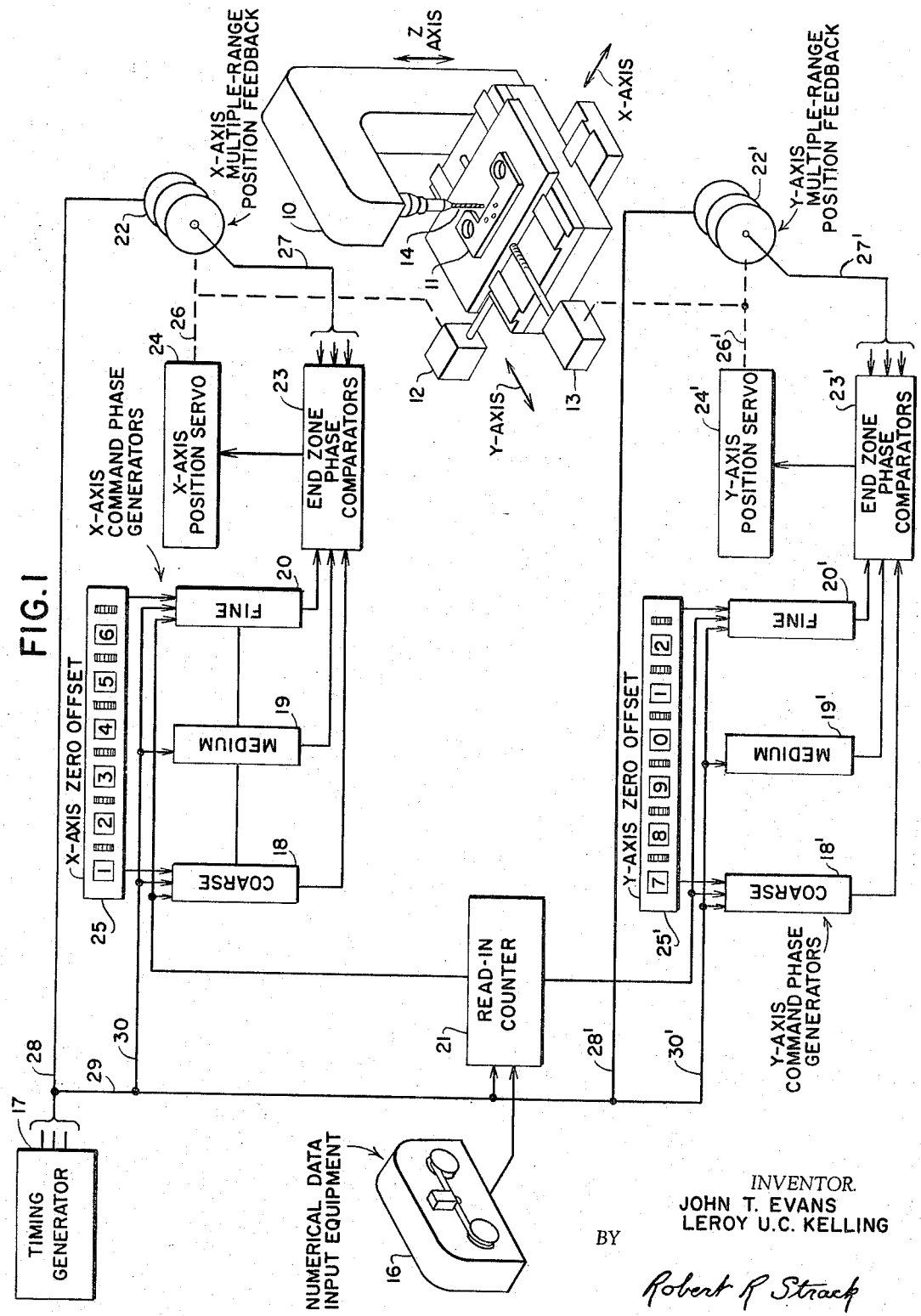

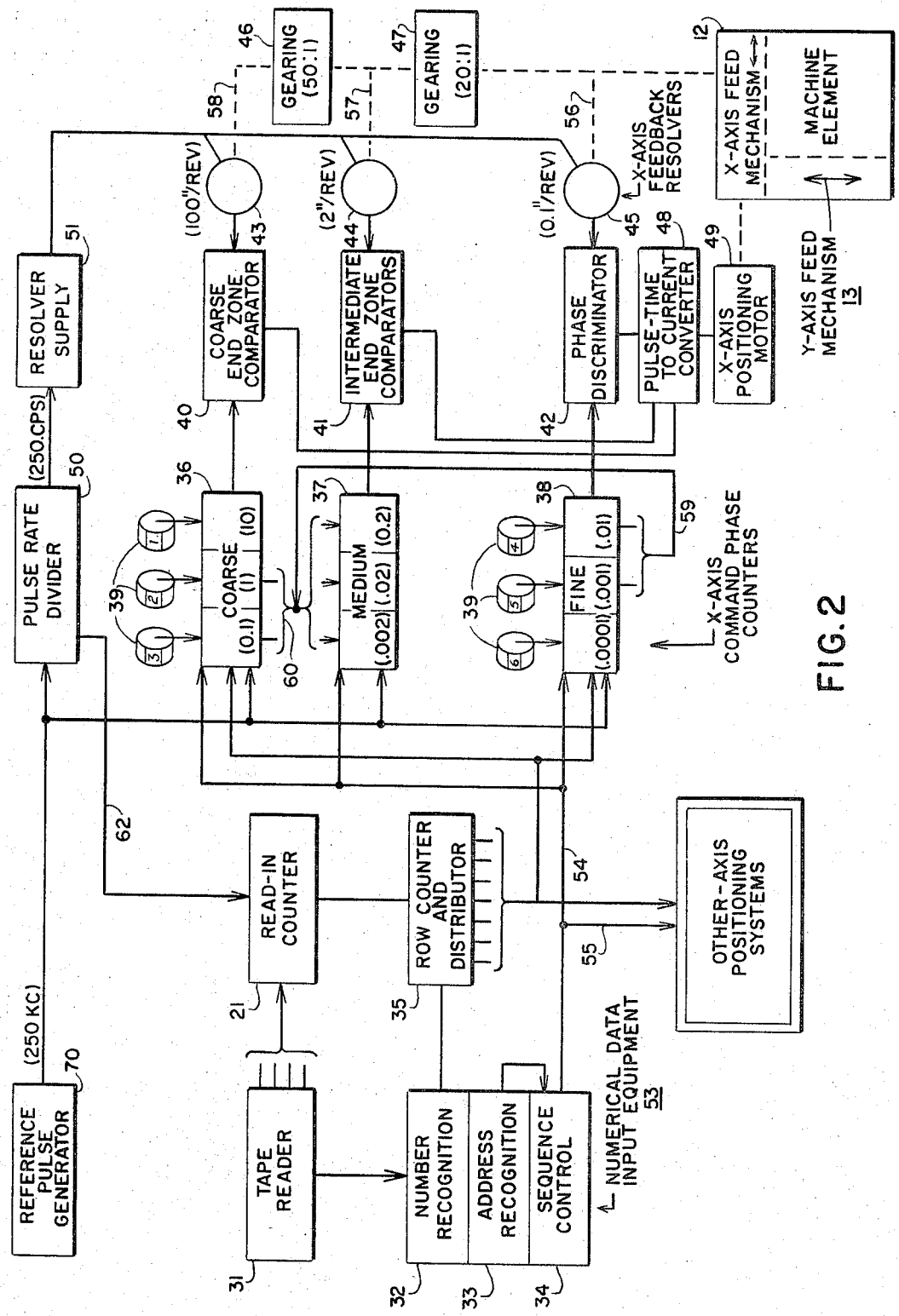

Left row labels: SET RESET (first group), JOINT TRIGGERING (middle group), SEPARATE TRIGGERING (bottom group).

FIG. 3A

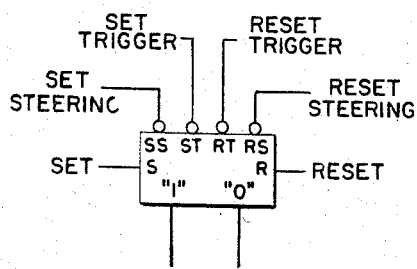

FIG. 3

A, B → C = $\overline{(A+B)}$  FIG. 4A

A → B = $\overline{A}$  FIG. 4B

1-2-4-8 BINARY-CODED DECIMAL COUNT-DOWN DECADE

Dec. 13, 1966    J. T. EVANS ETAL    3,291,970
AUTOMATIC CONTROL APPARATUS
Filed Nov. 21, 1962    14 Sheets-Sheet 5

1-2-4-8 BINARY-CODED DECIMAL
COUNT-UP DECADE

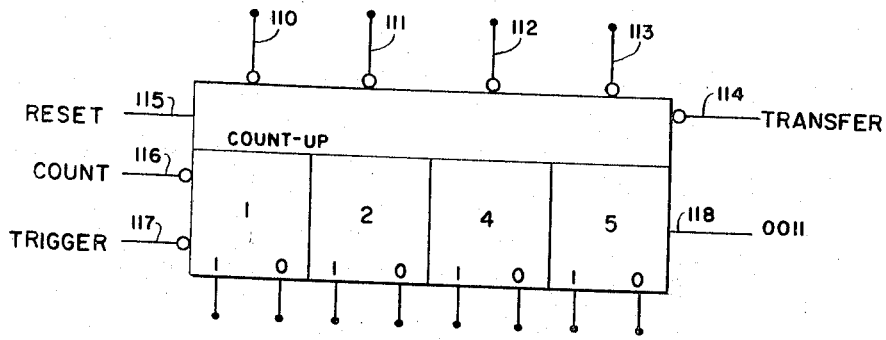
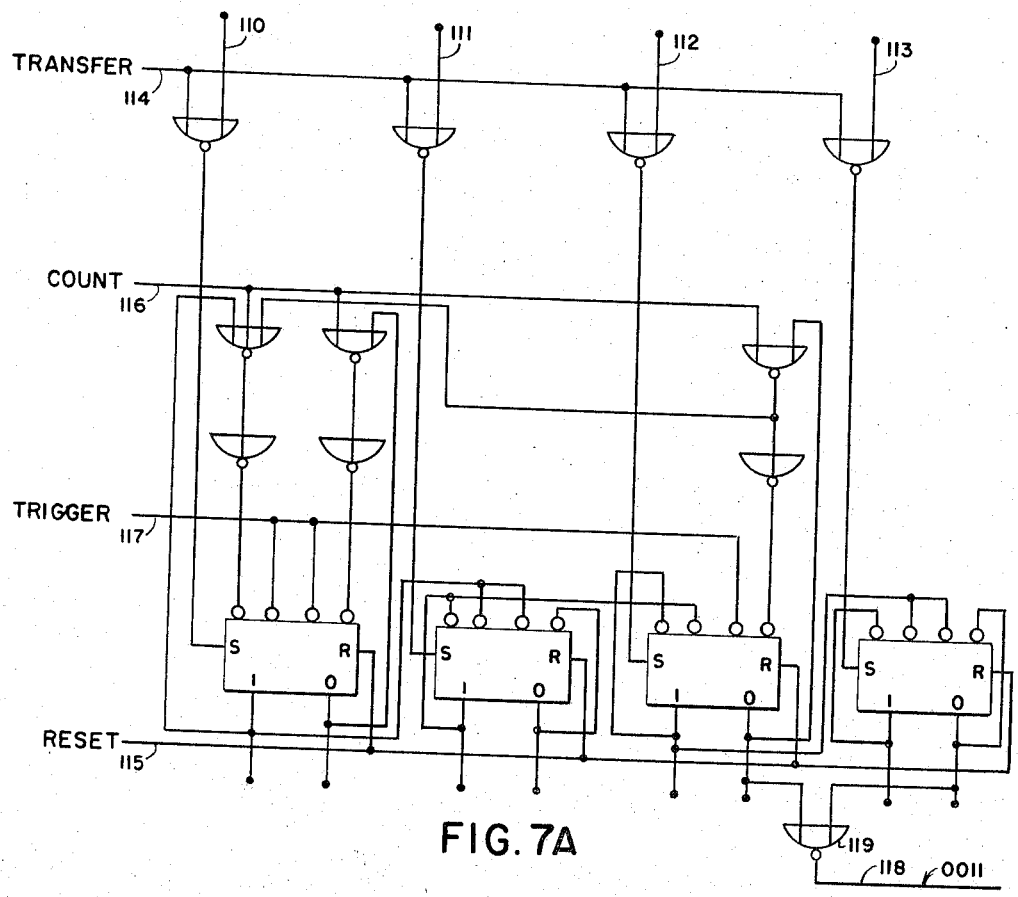

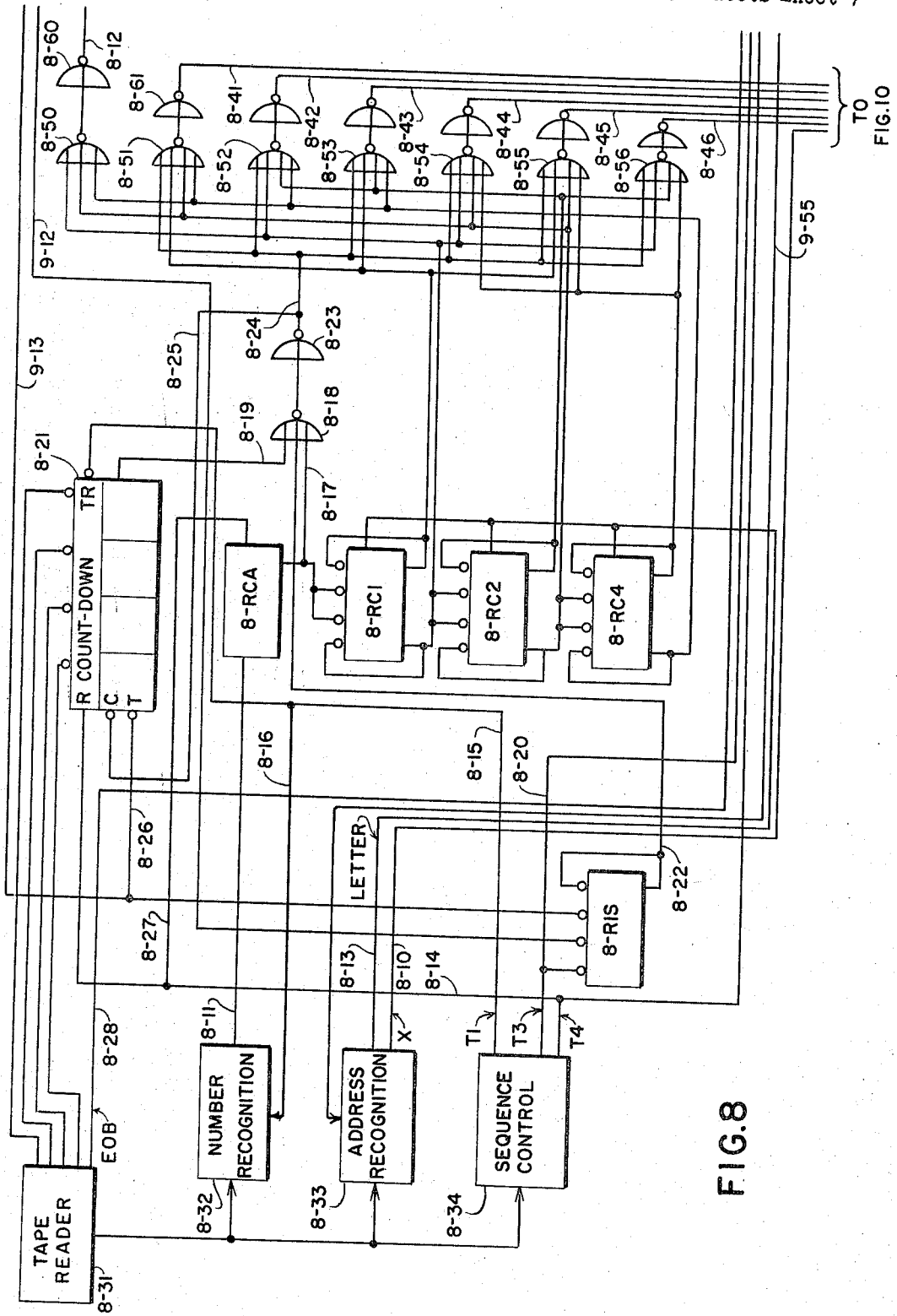

Dec. 13, 1966  J. T. EVANS ETAL  3,291,970
AUTOMATIC CONTROL APPARATUS
Filed Nov. 21, 1962  14 Sheets-Sheet 11

Dec. 13, 1966     J. T. EVANS ETAL     3,291,970
AUTOMATIC CONTROL APPARATUS
Filed Nov. 21, 1962                    14 Sheets-Sheet 13
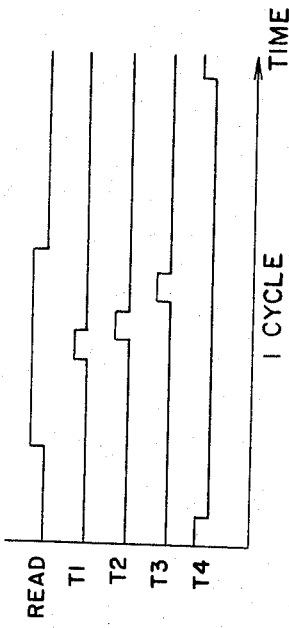
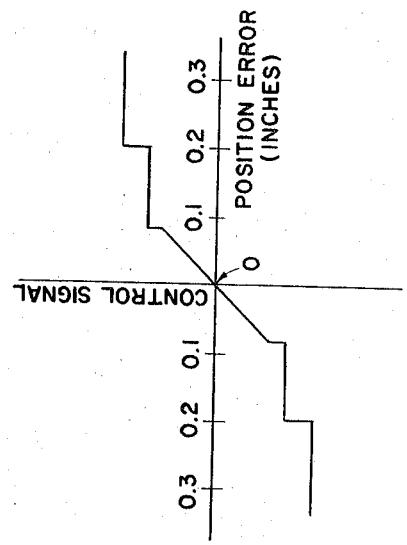
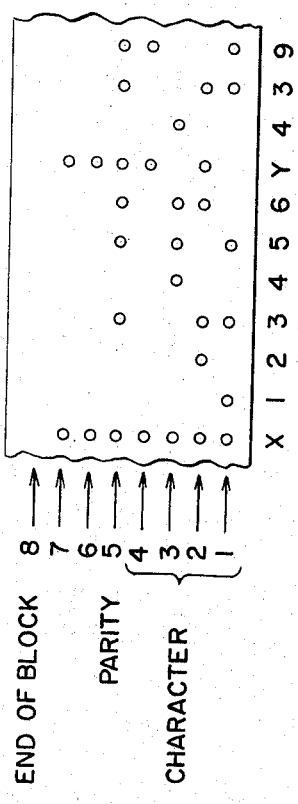
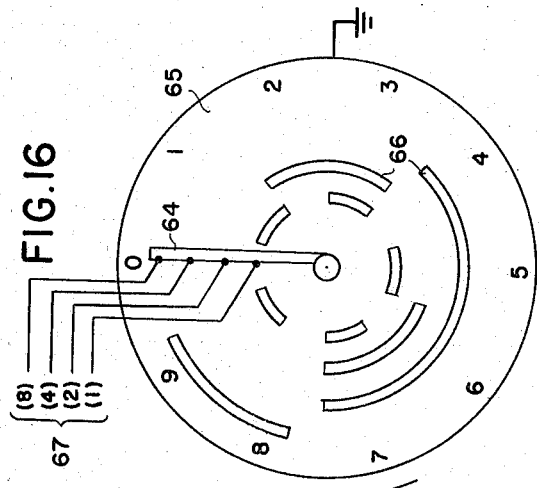

Dec. 13, 1966   J. T. EVANS ETAL   3,291,970
AUTOMATIC CONTROL APPARATUS
Filed Nov. 21, 1962   14 Sheets-Sheet 14

3,291,970
AUTOMATIC CONTROL APPARATUS
John T. Evans and Leroy U. C. Kelling, Waynesboro, Va., assignors to General Electric Company, a corporation of New York
Filed Nov. 21, 1962, Ser. No. 239,285
7 Claims. (Cl. 235—151.11)

This invention relates to electronic automatic control systems, and more particularly, to numerical control systems for controlling the position of the cutting element of a machine tool relative to a workpiece.

Machine tool control equipment may be considered to fall into the separate categories of "Numerical Contouring Control" systems and "Numerical Positioning Control" systems. Numerical Positioning Control primarily differs from Numerical Contouring Control because positioning solely requires a command containing information as to the ultimate location of a workpiece relative to a cutting element, whereas contouring requires commands containing information as to the rate of speed and the instantaneous direction of motion of a workpiece relative to a cutting tool. An example of the former type of system is contained in the co-pending patent application of Leroy U. C. Kelling, Serial No. 136,420, filed September 5, 1961, now Patent No. 3,226,649, and assigned to the General Electric Company, assignee of the present invention. An example of the latter type of system appears in the co-pending patent application of Leroy U. C. Kelling, Serial No. 136,049, filed September 5, 1961, now Patent No. 3,248,622, and also assigned to the General Electric Company.

The invention described hereinafter is embodied in a Numerical Positioning Control system. A large number of the features of this invention, however, are also applicable to Numerical Contouring Control systems.

An object of the present invention is to provide improved numerical control systems. This object is carried out in a specific illustrative embodiment by providing an improved Numerical Postiioning Control system.

Although a large number of systems have been developed for numerical control of positioning apparatus, the present invention belongs to that class of numerical control systems wherein the commanded position of the apparatus and the actual position of the apparatus are accurately represented by the phase of a command and position signal, respectively. In this class of sy:tem, the apparatus is positioned in accordance with the difference in phase.

In order to provide a system capable of positioning apparatus over an extended range, for example, 100 inches, with an accuracy in the order of .0001 of an inch, it has been found advantageous to use several feedback servo loops, each covering a different range of motion and, therefore, providing varying amounts of resolution. The embodiment hereinafter described uses a plurality of resolvers coupled to respond to motion in each axis of apparatus travel.

The resolvers are arranged to express different ranges of machine travel by being coupled to experience a complete revolution in response to different amounts of apparatus travel. Thus, a coarse resolver is coupled to experience a complete revolution in response to a full range of travel, for example, 100 inches; a medium, or intermediate, resolver is coupled to experience complete revolutions in response to successive portions of the full range of travel, for example, every 2 inches; and a fine resolver is coupled to experience complete revolutions in response to successive short ranges of travel, for example, every 0.1 inch. This combination of resolvers generates a position signal representative of the apparatus position with respect to a reference point, which consist of three components of vary resolution. In order to cooperate with these components of the position signal, the command signal is developed in three corresponding components which comprise a coarse, medium, and fine portion. Obviously, the particular range encompassed by each portion of the command signal is identical to the range encompassed by the individual resolvers in the feedback servo loops.

Once signals are developed which represent both the present and the desired position of the apparatus, the control system must provide means for utilizing these signals to most effectively move the apparatus to the desired position. The control system described hereinafter operates by instruction a rapid traverse of the feed mechanism until a position close to the command position is attained. In close proximity to the commanded position, the feed rate is decreased with the objective of reaching zero when the exact position is achieved. Obviously, initial comparisons between the commanded position and the actual position, to determine the direction of travel, may employ relatively coarse signals. In the embodiment to be described hereinafter, the coarse signal components are first compared in order to make an initial determination as to the direction in which the equipment must move. Subsequently, the medium signals, and finally, the fine signals are compared in order to achieve accurate positioning.

Another object of the present invention is to provide improved means for comparing phase-coded signals and selectively generating control signals in accordance with particular characteristics of the respective phase-coded signals.

Yet another object of the invention is to provide means for comparing phase-coded signals having varying degrees of resolution and selectively generating control signals having characteristics determined by the results of the comparison.

In the patent application, Serial No. 136,049, cited above, a positioning control system is disclosed wherein coarse comparison of the command signal with the position signal is accomplished by the establishment of zones and the determination of which zone the actual position falls within. By recognizing the different zones the position signal falls in, this positioning control system is able to determine how the machine mechanism should be controlled. When in close proximity to the desired position, a fine phase discriminator generates signals which are proportional to the deviation between actual position and desired position.

In contradistinction to the described patent application, the embodiment described hereinafter utilizes a plurality of command phase counters to develop the components of the phase-coded command signals. The output of each of these command phase counters is compared with the output of the feedback resolver having the corresponding range. A "coarse end zone" is developed by means associated with the coarse command phase counter. If the position signal is outside of this coarse end zone (in the embodiment an illustrative area within ±0.6 of an inch of the commanded position is adopted as the coarse end zone) a determination is made of the direction of traverse required, and a fixed amplitude signal is applied to drive the feed mechanism in that direction. When the position signal is within the coarse end zone, signal comparison is shifted to the intermediate range components of the command and position signals. A plurality of "intermediate end zones" are then developed by means associated with the medium command phase counter. While the position signal is within the wider intermediate end zones, but not within a preselected narrower intermediate end zone, a second smaller fixed amplitude feed signal is applied to the feed mechanism. Once the position signal is within the preselected narrower intermediate end zone a phase discriminator is used to compare the fine range components of the command and position signals and control the application of a feed signal to the feed mechanism that is proportional to the difference between said signals.

Another object of the present invention is to provide an improved numerical positioning system wherein a plurality of end zones are developed within which respective components of the command and position signals are compared.

Yet another object of the present invention is to develop an improved numerical positioning control system wherein the coarse and medium components of a command and a position signal are compared to determine their mutual presence within preselected end zones; and wherein the fine components of a command and a position signal are compared in a phase discriminator when both signals are within a preselected end zone, in order to develop a feed mechanism control signal which is commensurate with the difference between said phases.

An embodiment of the invention is described hereinafter in conjunction with an apparatus positoning system that operates in response to input data. The system includes coarse, medium, and fine command phase counters responsive to the input data to generate three phase-coded command signals representing a commanded position in dimensional ranges having successively finer resolution. Feedback resolvers and associated circuitry are coupled to the apparatus to generate phase-coded position signals representing the actual position in dimensional ranges equivalent to those of the command signals. A number of zone generating flip-flops are uniquely triggered when preselected numbers are registered in the command phase counter group to define zones within successively closer proximity to the commanded position. Cooperating flip-flops responsive to the position signals yield a discrete indication when the actual position of the apparatus is within these zones. Finally, control circuitry furnishes the signals to drive the apparatus into position with speeds determined by the zone in which the actual position resides.

The novel features of the invention are set forth with particularity in the appended claims. The invention itself, however, both as to its organization and method of operation, together with further advantages and features thereof, may best be understood by reference to the following description taken in conjunction with the accompanying drawings wherein:

FIGURE 1 is a general block schematic showing the basic components present in an illustrative numerical positioning control system embodying the features of the invention;

FIGURE 2 is a somewhat more detailed block schematic drawing illustrating the components and novel features of the invention as embodied in the control section for a single axis of machine motion;

FIGURE 3 shows the symbolic representation of a flip-flop of the nature used in the following illustrative embodiment of the invention;

FIGURE 3A is a truth table describing the operation of flip-flops such as symbolized by FIGURE 3;

FIGURE 4A shows the symbolic representation of a logic NOR circuit of the nature used in the following illustrative embodiment of the invention;

FIGURE 4B shows the symbolic representation of a logic inverter circuit of the nature used in the following illustrative embodiment of the invention;

FIGURES 5 through 7 and 5A, 6A and 7A show the symbols and typical logic diagrams of binary-coded-decimal counters of the type used in the following illustrative embodiment of the invention;

Figure 11:
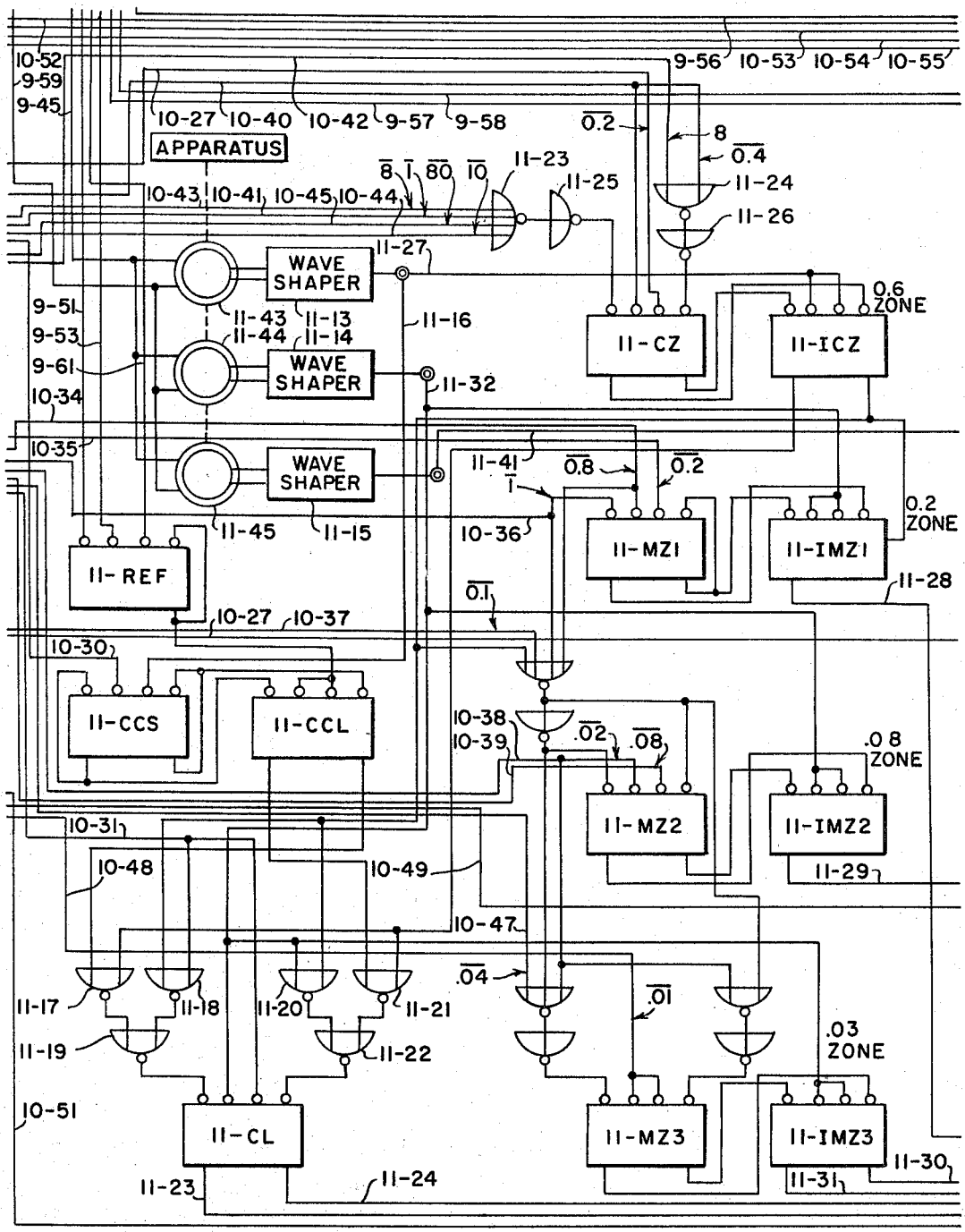
Figure 12:
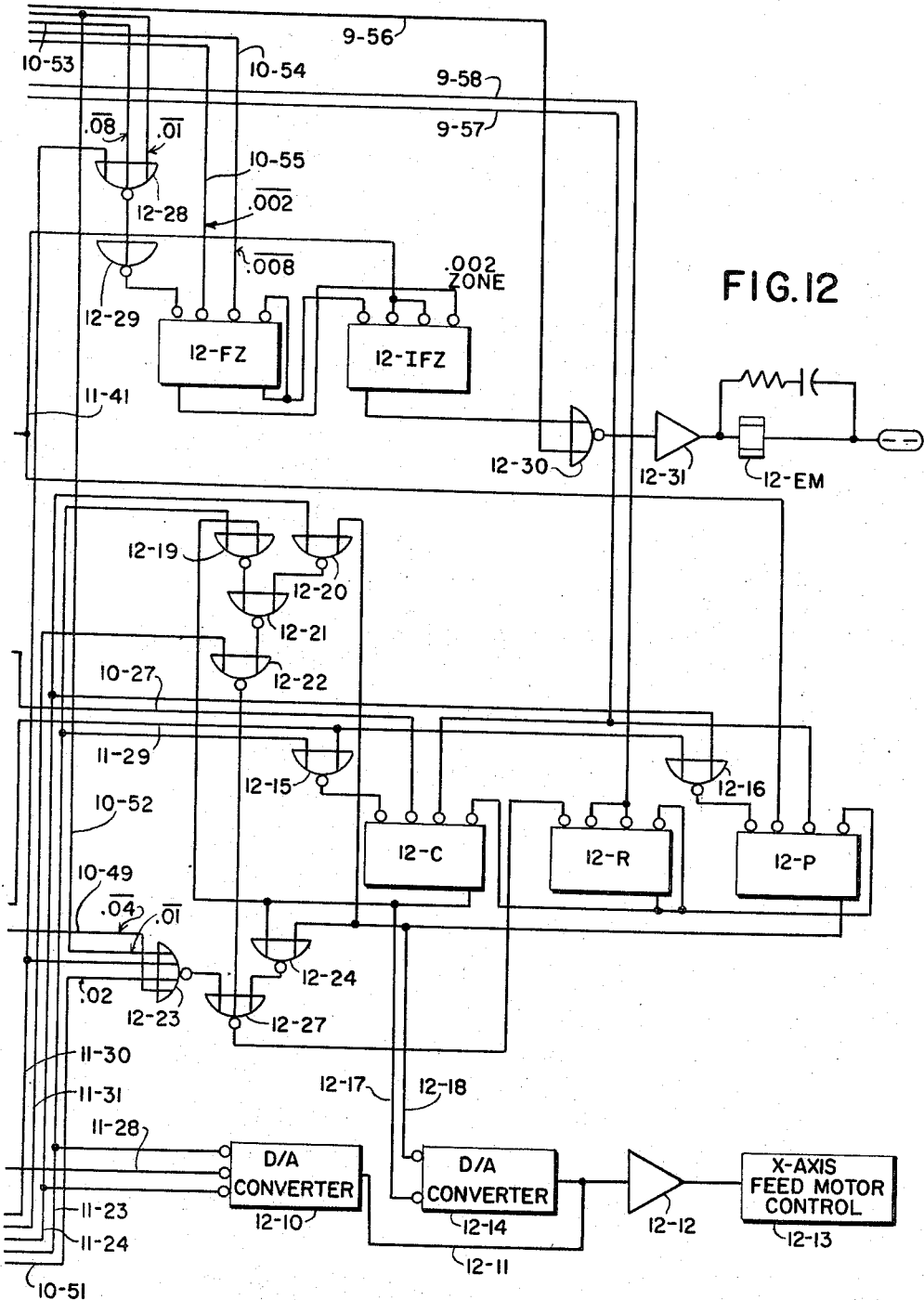
Figure 13:
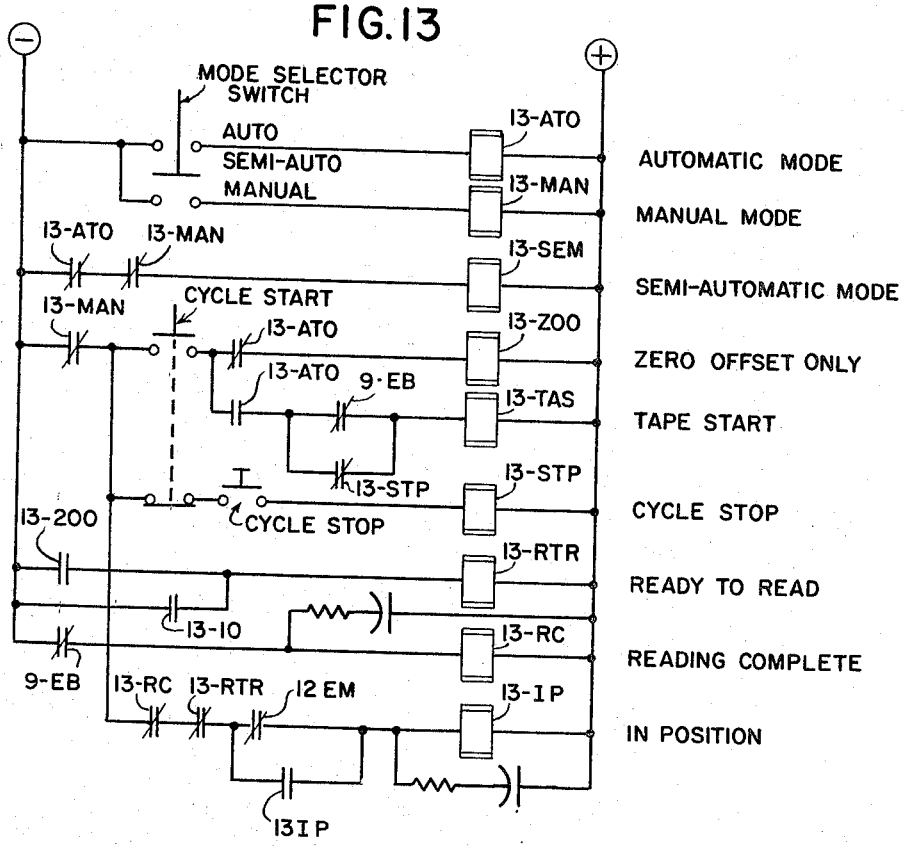
Figure 13A:
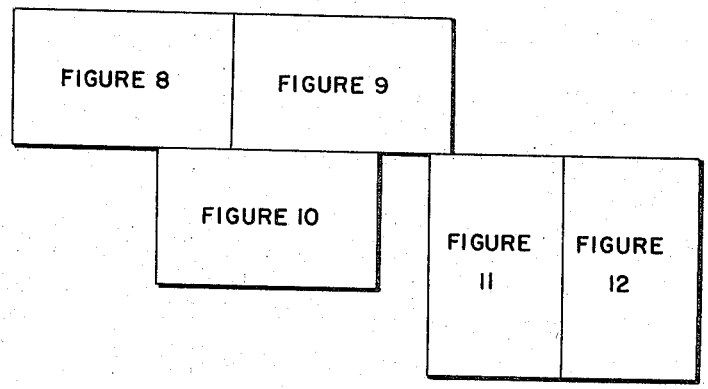
Figures 18, 19:
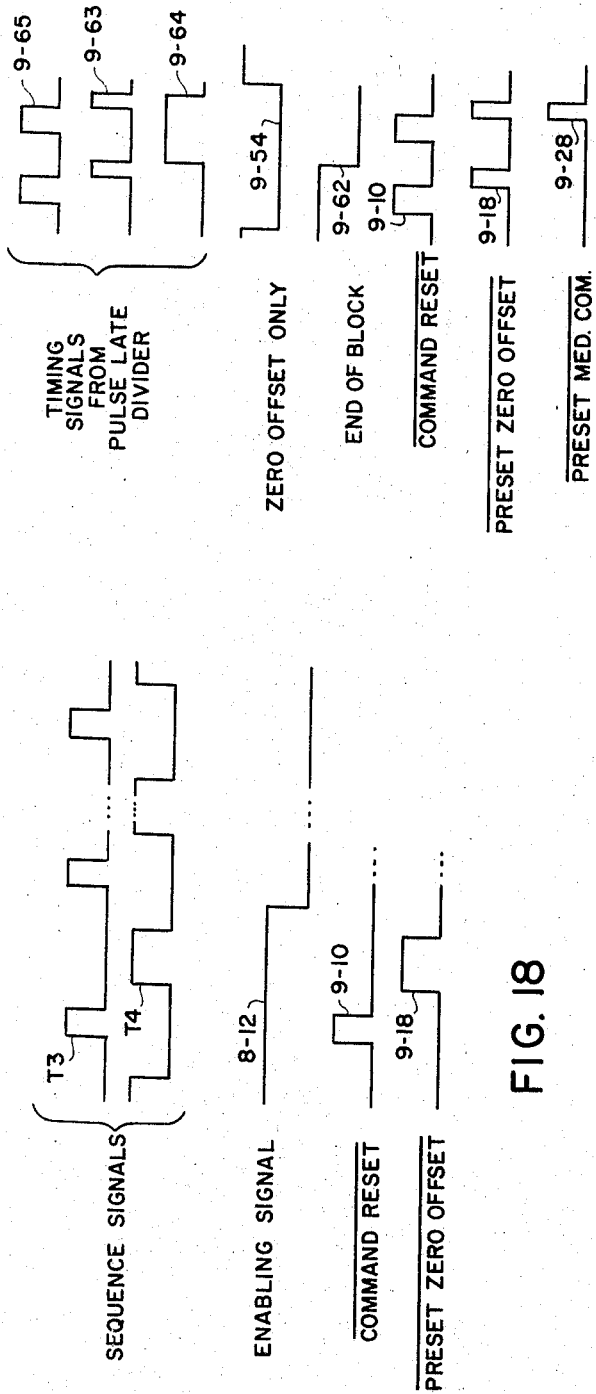

FIGURES 8 through 12 when arranged as shown by the sheet layout in FIGURE 13A comprise an interconnected logic circuit schematic of an illustrative embodiment of the invention;

FIGURE 13 is a circuit schematic showing a number of the control relays and switching means used in conjunction with the circuit of FIGURES 8 through 12;

FIGURE 14 illustrates a typical piece of punched tape of the nature contemplated for presenting numerical input data;

FIGURE 15 is a timing diagram for sequence control signals utilized in the following illustrative embodiment of the invention;

FIGURE 16 is a diagrammatic illustration of a decade switch which may be used to formulate zero offset data for insertion into command phase counters of the nature illustrated hereinafter;

FIGURE 16A is a chart showing the logic outputs for various positions of the switch shown in FIGURE 16;

FIGURE 17 is a graph showing apparatus velocity as a function of position error in close proximity to the commanded position; and FIGURES 18 and 19 are timing diagrams illustrating pertinent signals that are operative in the automatic and semi-automatic modes of operation, respectively.

GENERAL DESCRIPTION

FIGURE 1 contains a general block diagram of a control system of the nature contemplated. For purposes of illustration, a drill press 10 is illustrated on the right of the figure. It should be understood that the teachings of the invention are applicable to any machine control wherein the position of an operating machine element with respect to a workpiece is of importance.

The function of the entire system, as illustrated in FIGURE 1, is to control machine tool 10 automatically in response to numerical data as read from a numerical data input equipment 16 appearing on the left of the figure. Machine tool 10 comprises a cutting element 14 adapted to move in the vertical plane or along a Z axis. It further comprises a worktable adapted to move in a horizontal plane along both the X and Y axes. An X axis feed mechanism 12 and a Y axis feed mechanism 13 are illustrated for accomplishing this motion. During processing, a workpiece 11 is secured to the worktable of the machine and the table is thereafter positioned in accordance with the numerical data input for proper action by the cutting element 14.

The control system illustrated is adapted to control motion in both the X and Y coordinates. It will be obvious to those skilled in the art that motion in the Z axis, in addition to other control functions, may be easily performed in accordance with the teachings hereinafter.

All actions of the machine 10 are under the control of numerical data input equipment 16. For purposes of illustration, a punched tape input has been selected. Of course, other appropriate means may be used for presenting numerical data and these are also contemplated. A block of information on the punched tape, in accordance with the system to be described, contains all of the information necessary for one positioning operation. The data is presented in words, each of which has a letter address as the initial character. The characters in each word are made up of a plurality of simultaneously read elements encoded in the well-known binary form. An example of a word calling for a particular position on the X axis might be X123456, wherein each of the characters is represented in binary form. The letter address "X" designates that the following numerical characters represent a position on the X axis. Consequently, when this letter address is detected, the following numerical characters are routed to X axis control section of the control system for generation of command signals.

Before proceeding with a consideration of the processing of the command signals, it is worthwhile to consider the servo loops which are involved in the control of each axis of motion of the machine control element. The X axis and Y axis servo loops are structurally independent of each other in their action of driving the feed mechanisms. Since the equipment throughout the system for the X coordinate is precisely the same as for the Y coordinate, solely the X coordinate control section will be described. As shown in FIGURE 1, corresponding elements of the Y axis control section have been given the same numerical designation as those in the X axis control section. They are distinguished by a prime symbol (').

The X coordinate servo loop comprises an X axis position servo 24, including a D.C. amplifier driving a servo motor which by its output shaft 26 controls a feed motor control to actuate the X axis feed mechanism 12. Simultaneously, position servo shaft 26 drives the X axis multiple range position feedback resolvers 22. The output leads 27 of the multiple range position feedback resolvers provide an electrical representation of the position of the machine in the X coordinate since both the feed mechanism 12 and the multi-range position feedback resolvers 22 are driven in common by the position servo 24. Leads 27 are coupled into the X axis end zone phase comparators 23. The function of the end zone phase comparators is to compare the position signal applied over lead 27 with a command signal applied from the X axis command generators. By comparing the phases of the command signal and the feedback position signal, an error signal is developed which is fed into the servo mechanism 24 for driving the X axis feed mechanism.

It is now appropriate to consider the manner in which the command signals are generated. As already noted, numerical data input equipment 16 provides the numerical data representative of the desired position of the cutting element 14 with respect to the workpiece 11. A fundamental element in a phase control system such as contemplated herein is the timing generator 17. This generator produces a train of pulses having a predetermined repetition rate. It provides the carrier by which the command signals are transported throughout the control section; it is also used to develop synchronized pulse trains of selected repetition rates for use throughout the control system. Thus, one of the outputs of timing generator 17 is applied over lead 28 to the multiple range position feedback resolvers 22 and another of the outputs is applied over leads 29 and 30 to the command phase generators 18, 19, and 20. In common with other systems utilizing phase comparison between control and position signals, the basic reference pulse train represents a standard signal and the phase deviations between this standard signal and the command and position signals represent the distances of the commanded position and the actual position, respectively, from a predetermined reference point.

As shown, the command signal is developed in a plurality of command phase generators 18, 19, and 20. The utilization of these three command phase generators corresponds to the use of multiplte-range position feedback. In order to obtain the desired accuracy and resolution, a plurality of feedback resolvers having varying ranges are employed. In cooperation, therefore, with this servo loop arrangement, a plurality of command phase counters having similar ranges and resolution are used. When operating, the numerical data input equipment supplies the command phase generators with a number indicative of the commanded position to be assumed. This number is supplied via a read-in counter 21. Upon subsequent application of the pulse train from timing generator 17, each command phase counter produces an output signal having a phase representative of the particular component of the command signal in its own range. These components of the command signal are compared in end zone phase comparators 23 with the appropriate components from the multiple range position feedback resolvers 22 and develop the control voltages for position servo 24.

As pointed out hereinbefore, it is essential that an adjustable zero reference point be available. Means are incorporated, as shown by X axis zero offset 25, for presetting into the command phase generators a number representative of the position in the X axis which is to be considered the zero reference point.

A further item should be considered before proceeding to an examination of the more detailed block schematic in FIGURE 2. In the present system, the numerical data input equipment is assumed to provide command data with a resolution of .0001 of an inch for positioning up to 100 inches. This requires six decimal digits. As designed, the equipment has a coarse, medium, and fine command phase generator. The three most significant digits of a command signal are stored in the coarse command generator 18 and the three least significant digits are stored in the fine command phase generator 20. From these stored digits, an intermediate number is developed which has a range corersponding to the intermediate resolver range of the multiple range position feedback resolver group 22. Thus, the medium command phase generator 19 does not receive information from the numerical data input equipment 16 but rather, from the coarse and fine command phase generators 18 and 20.

A more complete understanding of the unique features of the invention may be gleaned from a consideration of the more detailed block's schematic in FIGURE 2. In this figure, the numerical data input equipment 16 has been replaced by Numerical Data Input Equipment 53. The command phase generators, end zone phase comparators, and multiple range position feedback resolvers have been illustrated in terms of their component parts. It will be noted that only the X axis control section is illustrated in FIGURE 2. This is because the other coordinates of motion are controlled by substantially similar circuitry.

As shown in FIGURE 2, the Numerical Data Input Equipment 53 comprises, a tape reader 31; a number recognition means 32 for recognizing numerical characters; an address recognition means 33 for recognizing letter characters; and a sequence control means 34 for controlling information read-in and circuit operation in response to the input data. Thus, when an address is recognized, sequence control 34 operates to select the section of the control system to be rendered operative. When an X address appears, this selection results in control over the X axis command phase counters via lead 54. When other addresses appear, control is asserted over appropriate sections, as illustrated by lead 55 connected to "Other-Axis Positioning Systems" 52.

Sequence control 34 resets the command phase counters to prepare the selected control section for the receipt of new command data. A signal is then generated to transfer the zero reference data to the appropriate command phase counters. This will be described shortly. Thereafter, the individual control characters are used to preset read-in counter 21. As each character is determined by number recognition 32 to be numeric, read-in counter 21 operates to produce a series of pulses equal to the number preset therein for distribution via row counter and distributor 35 to the appropriate portions of the command phase counters 36 and 38.

Consideration should be given to the command phase counters 36, 37, and 38. Three separate command phase counters are used to generate components of the command signal representative of various ranges. Each command phase counter is a binary coded count-up circuit operative to assume one thousand discrete permutations of output conditions. Furthermore, each comand phase counter comprises three separate decades which are operative in binary-coded-decimal form to count from 1 to 10. Thus, the application of successive pulses from a reference pulse train generator 70 causes the command phase counters to register numbers of successively higher value until a full count is registered and an output is produced. The counting cycle continues as long as input pulses are applied.

When the output of a command phase counter is compared with a reference signal that is a synchronism with the input signal and has a repetition rate equal to 1/1000 thereof, the output will lead that reference signal by a period of time commensurate with the number originally stored in the command phase counter. This being so, the output from each command phase counter is a phase coded signal discretely representing the number originally stored therein.

In operation, the most significant three digits of a command are stored in coarse command phase counter 36 and the least significant three digits are stored in fine command phase counter 38. Thus, the outputs from the command phase counters represent coarse and fine components of the original command data. A medium command phase counter 37 is selectively supplied from both the coarse and fine command phase counters to register an initial count of intermediate value and in response to input pulses generates a phase coded signal in the intermediate range.

The diagram in FIGURE 2 includes numerical notations representative of specific dimensions or valves which have been adopted for purposes of describing circuit operation. The reference pulse train generator 70 has the parenthetical notation 250 kc. adjacent thereto. This indicates that the pulse train therefrom is assumed to have a repetition rate of 250 kilocycles per second. Also, the command phase counters are divided into three blocks each having parenthetical notations. In coarse command phase counter 36, for example, these are 0.1, 1, and 10. These notations indicate that the decades represented by each of these blocks register numbers wherein each bit or element of the respective decade is assigned the decimal weights of 0.1, 1, and 10, respectively; the decimal values representing apparatus position in inches. Further, the resolvers 43, 44, and 45 are accompanied by the parenthetical expressions: 100″/rev, 2″/rev, and 0.1″/rev, respectively. These expressions indicate that a single revolution of any one of these resolvers represents the cited distance of travel.

An understanding of the typical operations within any one control section may be best illustrated by considering a cycle of operation.

Upon the application of power, reference pulse train generator 70 delivers a pulse train having a repetition rate of 250 kilocycles per second to both pulse rate divider 50 and the command phase counters. The effect of these pulses upon the feedback circuitry which generates the actual position signal will first be considered.

Pulse rate divider 50 is a divide-by-1000 device of a nature well known in the art. The output of this device, a pulse train having a repetition rate of 250 cycles per second, is applied to a resolver supply 51. The function of resolver supply 51 is to develop an appropriate input signal for each of the resolvers 43, 44, and 45. These resolvers are conventionally energized by a pair of equal amplitude sine wave signals having a 90° phase difference therebetween. Effectively, this phase difference permits the application of a sine and cosine signal to the orthogonally disposed windings of the resolvers. As a result of resolver action, the specific position of the rotor causes the generation of an output in a secondary winding which has a phase with respect to the original signal from pulse rate divider 50 that is directly proportional to the amount of rotation of the rotor. Thus, each of resolvers 43, 44, and 45 generates an output signal having a phase displacement commensurate with the position of the machine element they are monitoring.

Due to the coupling between the X axis feed mechanism 12 and each of the resolvers, their output signals are restricted to particular operating ranges. Resolver 45 is coupled to the X axis feed mechanism by means schematically illustrated by line 56 to produce a complete revolution for 0.1 of an inch of apparatus travel. Resolver 44 is coupled to the X axis feed mechanism by means schematically illustrated by line 57 and gearing mechanism 47 to produce a complete revolution in response to each 2 inches of apparatus travel. Similarly, coarse resolver 43 is coupled to the X axis feed mechanism by means schematically illustrated by line 58, gearing means 46, and gearing means 47 to produce a complete revolution in response to 100 inches of travel. This relationship between each of the resolvers is maintained by gearing 46 and 47 which are shown to have a 50:1 ratio and a 20:1 ratio, respectively.

It should be noted that the ratio between resolvers is no greater than 50:1. It has been found, after taking into consideration the multiplicity of factors which affect the resolution available from individual resolvers and the circuitry associated therewith, that it is expedient to so limit the ratio. It has been found, for example, that a ratio of 100:1 may not be efficiently utilized in spite of the fact that the individual resolvers can easily provide resolution of the nature required to use this coupling ratio in a system having the above stipulated accuracy.

Returning to circuit operation, it is established that coarse resolver 43 is producing a 250 cycle per second signal having a phase representative of the apparatus position within a 100 inch range; medium resolver 44 is producing a 250 cycle per second signal having a phase representative of the apparatus position within a 2 inch range; and fine resolver 45 is producing a 250 cycle per second signal having a phase representative of the position of the apparatus within a 0.1 of an inch range. These signals are individually applied to a coarse end zone comparator 40, intermediate end zone comparators 41, and phase discriminator 42, respectively.

Upon recognition in address recognition circuitry 33 of a data word containing information for the X axis control mechanism, sequence control 34 applies signals to reset each of the command phase counters 36, 37, and 38 associated with the X axis control section. These counters are then preset with numbers representing the sum of zero offset to the desired reference point and the commanded position.

As previously mentioned, the workpiece may be attached to the table of the machine in different positions and consequently, a reference must be established in each direction of traverse. Simple means have been developed wherein values may be applied to each decade of the command phase counters which are representative of the offset of a desired reference from a permanent reference point. Because the input information comprises six decimal digits, six decimal digits must be applied by the zero offset means to establish this new zero reference point. Switch means 39 are schematically illustrated as associated with each decade of the coarse and fine command phase counters 36 and 38. After resetting all counters to zero, sequence control circuit 34 generates a signal to transfer the numbers stored in the zero offset switches directly into the command phase counters they are individually associated with.

The tape or other data presentation means is thereupon stepped to its next position and assuming that a number is recognized by number recognition circuit 32, the data representative of that number is preset into read-in counter 21. Read-in counter 21 is a simple decade counter operating in the same binary-coded-decimal system in which the data is presented. Under the control of sequence control 34, once read-in counter 21 has received a complete character, pulses from pulse rate divider 50 on lead 62 are applied at a relatively high repetition rate to start counting therein. In response to this counting, output pulses equal to the number preset are supplied from read-in counter 21 through row counter and distributor 35 to the appropriate decade of the command phase counter. If it is assumed that the first number read is the most significant digit of the command, this is recognized and the output pulses are routed from read-in counter 21 to the (10) decade of coarse command phase counter 36. It will be recalled that the command phase counters are count-up circuits and consequently, the application of the pulses from read-in counter 21 to any one of the decades is effective to increase the number originally stored therein by the zero offset means by the number read from the numerical data input equipment.

As successive numerical characters are read from the input equipment, they are first set into read-in counter 21 and thereafter counted out in response to pulses from reference pulse train generator 70 and applied to the count inputs of the appropriate decades of the command phase counters under the control of row counter and distributor 35. If the addition of counts to any decade causes the total registered in that decade to exceed nine, as the count changes from nine to zero, a carry signal will be propagated to the next most significant decade, increasing its registration by one. If, as a result of a carry signal the count registered in a decade is changed from nine to zero, this also results in a carry to the next most significant decade. It should be recognized that in the system illustrated, only six decimal digits are employed. Subdividing this into coarse and fine components yields three decimal digits for the coarse component and three decimal digits for the fine component. In the system contemplated herein, these components are stored under the control of the row counter and distributor 35 directly into the coarse and fine command phase counters 36 and 38, respectively. However, because the desired accuracy and design efficiency have led to the design of a three-part feedback signal system, intermediate range figures are needed. In order to develop such intermediate range figures, binary values are selectively extracted from both the coarse and fine command phase counters and applied as inputs to medium command phase counter 37.

As shown, medium command phase counter 37 is preset by a number of outputs from the coarse and fine command phase counters 36, 38 via a plurality of leads schematically illustrated by lead 59 and lead 60. The read-in of this information to the medium command phase counter is effected after the other counters are preset and before the command signal is generated.

When each of the command phase counters stores a number representative of the sum of the commanded position plus the zero offset, sequence control 54 generates appropriate signals for the transfer of selected portions of each digit in the coarse and fine command phase counters into medium command phase counter 37. Upon completion of this operation, the command phase counters register numbers in binary-coded-decimal form representative of the commanded position in a coarse, medium, and fine range.

Sequence control 34 supplies an actuating signal which gates the pulse train from generator 17 into each of the command phase counters and they begin to count up. Command phase counters are recognized in the art and their operation may be easily understood. Since each command phase counter comprises three binary-coded-decimal decades, they divide the input by one thousand and an output pulse may be extracted from the last decade which has a frequency equal to $\frac{1}{1000}$ of the input frequency. This output appears at an instant of time such that the time between this appearance and the occurrence of the one thousandth pulse applied to the command phase counter is proportional to the originally registered number. If the output is compared with a signal derived by simply dividing the input signal by one thousand, there is a phase difference commensurate in magnitude with the magnitude of the originally registered number. The difference between the signal from a command phase counter and a reference position is indicated by the amount by which the command signal leads the reference signal. Thus, comparison of the output from each of the command phase counters with the output from the resolvers is effective to provide an error signal which represents the difference between the commanded position and the actual position. Once the error signal is available, means are required to convert it to a form for use in driving the feed mechanism.

In numerical positioning control, it is customary to drive the positioning feed mechanism at a constant rate of speed over the major portion of any distance to be traversed. For this reason, the generation of analog voltages proportional to the error between two widely divergent positions is generally unnecessary. The present invention, recognizing this fact, establishes end zones within which special consideration is given to the phase difference between the command and position signals, and outside of which, only the basic determination of which signal is leading is made. For large differences between the command and position signals, a single output is provided which drives the feed mechanism in either required direction at a constant rate of speed until the apparatus comes within a preselected end zone. Once within this zone, comparison is made between the signals of the intermediate command phase counter and feedback resolver to accurately determine the direction of traverse and thereafter, when within a more sharply defined end zone, the fine resolution command signal and feedback signal are used to develop an analog signal having a magnitude proportional to the amount of error. Thus, the machine feed mechanism and control system are designed to cooperate completely without developing more information than is necessary, and with the necessary information being developed as economically and efficiently as possible.

It should be understood that in some instances it is advantageous to develop analog signals to drive the feed mechanism over a larger error range than that illustrated herein. In this case, phase discriminators may be employed to develop analog error signals in response to comparison of the medium, or even the coarse, command and position signals.

As shown in FIGURE 2 of the illustrative embodiment, coarse end zone comparison and intermediate end zone comparison is handled in blocks 40 and 41. Thereafter, a phase discriminator 42 compares the fine component of the command signal and the fine component of the feedback signal and supplies an analog voltage to a pulse-time-to-current converter 48 which in turn drives the X axis positioning motor 49.

With the general functioning of the proposed numerical positioning control system in mind, a more complete understanding will be available from a consideration of a specific circuit designed to perform the described functions. Of course, equivalent elements may be substituted by those skilled in the art for the particular elements employed. The specific circuitry illustrated in the circuit schematic composed of FIGURES 8 through 13, and described hereinafter, is merely by way of example.

DETAILED DESCRIPTION

Circuit symbology

Several techniques have been used to make it easier to follow the operation of the illustrative circuit.

For convenience in locating the elements of the circuitry and as an aid in recognizing the function of these elements, they have been given a two-part designation. In this designation, the numerical prefix represents the figure in which the element appears and the alphabetical suffix is generally descriptive of the function performed by the particular circuit element. For example, element 9–EOB is a flip-flop in FIGURE 9 which is set at the End Of each Block of data. The lead designations and other elements also bear numerical prefixes indicative of the figure in which they originate; however, numerical suffixes are used to differentiate between the various elements in each figure.

Figure 9:
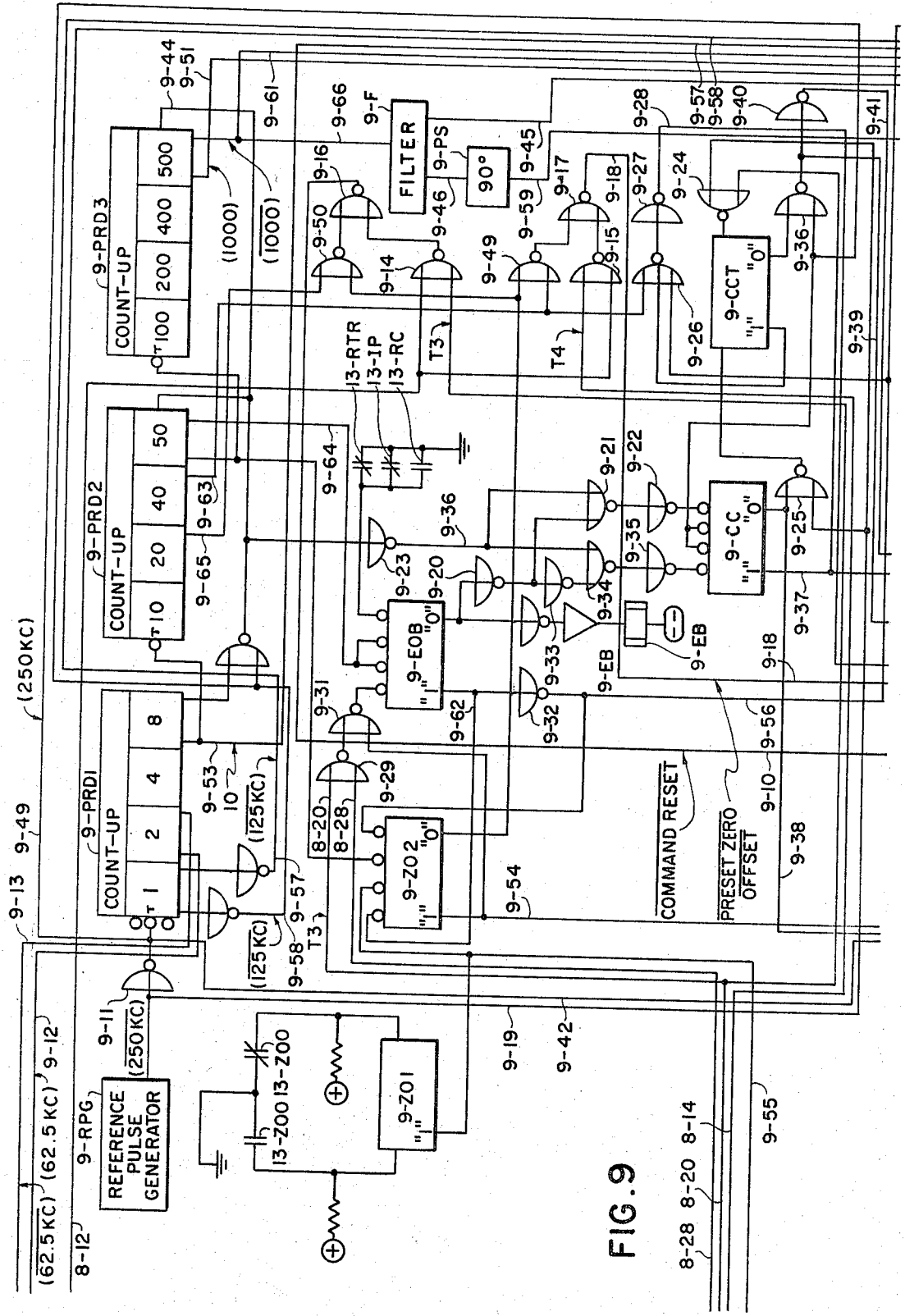

As a further aid in recognizing the leads over which important control signals are applied, functional lead descriptions are used in addition to the numerical descriptions. These functional descriptions are associated with the appropriate leads by means of small arrows. For example, lead 9–10 in the lower central portion of FIGURE 9, is designated $\overline{\text{Command Reset}}$. This indicates that the signal for resetting the command phase counters is transmitted via this lead. Also, when a bar is placed above this type of functional lead description, it indicates that the operative signal is a logic 0. The absence of such a bar indicates that the operative signal is a logic 1.

In connection with the control relays, shown primarily in FIGURE 13, it will be seen that the detached contact form of illustration has been used. This type of illustration lends itself to increased clarity of circuit description and a more complete understanding of circuit operation by physically locating the contacts of a relay in the areas of a circuit where their operation performs an operative function. The contacts bear the same designation as the relay winding and are therefore easily identified. In the drawings, normally open contacts are illustrated by a pair of short parallel lines orthogonally inserted in the series path they interrupt when operated, and normally closed contacts are similarly illustrated with an additional slanting line intersecting the parallel line symbol. In FIGURE 13, contacts 13–ZO0 in the energizing circuit of ready-to-read relay 13–RTR represent typical normally open contacts and contacts 13–ATO and 13–MAN in the energizing circuit of the semiautomatic mode relay 13–SEM represent normally closed contacts.

The convention adopted herein is that a logic value "0" applied on a lead, means that a positive voltage is applied. The logic value "1," on the other hand, is represented by a zero or negative voltage. This notation is consistent with the practice followed in the authoritative text on logic switching and design by Keister, Richie, and Washburn, entitled, "The Design of Switching Circuits," D. Van Nostrand and Company, 1951.

The timing diagrams in FIGURES 15, 18, and 19 are illustrated in accordance with the described convention. Thus, the basic level, which corresponds to a zero voltage, represents a logic 1; the raised or pedestal level, which corresponds to a +6 voltage, represents a logic 0.

In order to more succinctly set forth the circuit schematic in FIGURES 8 through 12, conventional symbols have been used to represent various logic and circuit functions. The symbols employed most frequently are illustrated in FIGURES 3 through 7. Any number of specific circuit configurations may be developed by those skilled in the art to perform the functions designated by the various circuit symbols. The voltages supplied to operate the circuits are, of course, dependent upon the specific components employed; consequently, only the polarity of the voltage source is shown in the circuit schematics. In situations where it is desired to express a difference in magnitude between a first and a second voltage of the same polarity, a different number of polarity symbols are used. For example, (−) is less than (− −). These symbols do not convey the degree of difference in magnitude, only the sense of the difference.

All digital logic circuits require devices to perform logic functions on the one hand, and storage or memory functions on the other. The logic functions in this system are performed by NOR circuits as represented in FIGURE 4. The memory or storage is provided by the bistable multivibrators or flip-flops represented in FIGURE 3.

It is well known that any Boolean equation can be synthesized with NOR logic exclusively. A gate for performing this logic operation is shown by the symbol in FIGURE 4A having inputs A and B and output C. Simply, this logic function can be defined as follows: If the A input or the B input, or both, have a logic value 1 applied thereto, then the output C has the logic value of 0. Stating it another way, the output C is equal to logic 1 if neither the input A nor the input B has the logic value 1.

FIGURE 4B is a single input NOR circuit. This is an inverter, but the notation utilized is the same as that for FIGURE 4A. The output B of the inverter always takes the opposite logic value from that of the input A.

There are many different circuits for developing the logic components represented in FIGURES 4A and 4B. However, particularly useful transistor NOR circuits for use in this numerical positioning control system are disclosed in a standard text on transistorized digital logic components entitled, "Design of Transistorized Circuits for Digital Computers," by Abraham I. Pressman, John F. Rider, Publisher, Inc., New York, 1959. More particularly, a preferred two input transistor NOR circuit is shown in FIGURE 8–1, at page 8–191. The inverter of FIGURE 4B may be developed by having solely one input to the NOR circuit of FIGURE 8–1 of the Pressman test. It is often the case that the NOR package must handle more than two input variables. This is very easily accomplished since two or more NOR circuits may be placed in parallel to provide the required function. Thus, in FIGURE 8–16, at page 8–212 of the Pressman text, there may be found two NOR circuits in parallel to provide a 0 output if one or more of the four input leads has a logic value 1 applied thereto. The parallel array may be increased considerably so that a large number of inputs, indeed a few dozen inputs, may be arranged to perform this logic function. The over-all system operation is not affected adversely by this paralleling of the circuits since each of the NOR circuits has a transistor amplifier therein, whereby appropriate potential and current values are A typical bistable multivibrator or flip-flop, used primarily for storage or memory, is shown in FIGURE 3. This flip-flop may be developed in accordance with the circuit in the Pressman text shown in FIGURE 11–7, at page 11–296, by opening each of the two loops connecting each of the output leads with its input steering lead. Set and Reset inputs may be implemented by applying two input signals to the bases of the two transistors of the flip-flop, respectively, through a series resistor connected to each base terminal. The logic of the multivibrator of FIGURE 3 is completely represented in the truth table of FIGURE 3A.

The truth table is divided into three horizontal sections. The first of these sections, designated on the left as "Set-Reset," illustrates the logic output conditions for various logic inputs on the flip-flop Set (S) and Reset (R) terminals. The second horizontal section, designated "Joint Triggering," illustrates the logic output conditions when logic 0 inputs are maintained on terminals S and R and triggering impulses (voltage transitions from a logic 1 to a logic 0) are simultaneously applied to the Set Trigger (ST) and Reset Trigger (RT) terminals, while various logic values are applied to the Set Steering (SS) and Reset Steering (RS) terminals. The third horizontal section, designated "Separate Triggering," illustrates the logic output conditions when logic 0 inputs are maintained on terminals S and R and triggering impulses are independently applied to the ST and RT terminals.

The vertical columns in the truth table of FIGURE 3A represent the logic conditions at the various terminals of a typical flip-flop. In general, this is self-explanatory; however, with respect to the columns designated "Outputs," it should be noted that the condition of the flip-flop outputs before and after the application of an operative input is indicated. Thus, the representation "$1_n$" indicates the state of the output lead "1" prior to the application of an operative input signal, while the representation "$1_{n+1}$" indicates the state of the output lead "1" immediately after the application of an operative input signal. The notation for output lead "0" in the truth table is the same as that for output lead "1."

Considering the operation of the Set and Reset leads, it will be seen that these two inputs completely swamp the flip-flop and override any condition that exists prior to the application thereof. The truth table demonstrates the logic operation of the inputs as the entering arguments. Irrespective of any condition on other input leads, the application of a logic 1 to the S lead will place a logic 1 at the "1" output, and the application of a logic 1 to the R lead will provide a logic 1 at the "0" output. For purposes of discussion, a flip-flop is regarded as "set" when a logic 1 is presented at the "1" output, and as "reset" when a logic 1 is presented at the "0" output.

When the set trigger and reset trigger inputs ST and RT, respectively, are tied together, the functioning of the flip-flop in FIGURE 3 is represented by the second section of the truth table in FIGURE 3A. Ordinarily, as used in the following circuitry, the reference pulse train is applied to this joint trigger input. The pulse train is steered out of the flip-flop through either the "1" or "0" leads, dependent upon the state of the set steering lead SS and the reset steering lead RS. It may be seen that the application of a logic 0 on either steering lead will be effective to produce a logic 1 on the corresponding output upon occurrence of the trigger pulse. If the corresponding output of the flip-flop is already in a "1" state, no change will be generated.

The flip-flop of FIGURE 3 need not have its trigger leads ST and RT tied together. The third section of the truth table describes the operation of the flip-flop under this condition.

In addition to the leads and inputs described, it is sometimes necessary to apply an additional trigger input to the flip-flop, this second trigger input being operative in accordance with the condition of second steering inputs. The particular circuitry to effect these additional inputs is not germane to the invention and any implementing technique is acceptable. The symbol for such a "double-steered" flip-flop is used in FIGURE 6A, wherein the first stage 104 has a second Set Steering input SS2, a second Reset Steering input RS2, a second Set Trigger input ST2, and a second Reset Trigger input RT2. Signals on these terminals are effective, as previously described, to control the condition of the flip-flop.

The flip-flop illustrated in FIGURE 3 is readily used as a binary counting stage in a binary-coded-decimal counter. In general, the use of the flip-flop as a counting element may be accomplished by joining the trigger leads ST and RT and interconnecting the "1" output lead to the set steering lead and the "0" output lead to the reset steering lead. With this feedback connection, the flip-flop is constrained to act as a counter such that every time a pulse appears on the trigger input leads ST and RT, the outputs "1" and "0" change their state. This is seen by reference to the truth table of FIGURE 3A. The mechanization of such circuitry is shown in detail in the above mentioned Pressman reference in FIGURE 11-7, at page 11-296.

The detailed circuit schematic appearing in FIGURES 8 through 12 uses a number of counting circuits in order to perform the control operation. In order to more easily understand these operations, the general composition of typical counters which may be employed to perform the required functions will be described.

Figure 5:
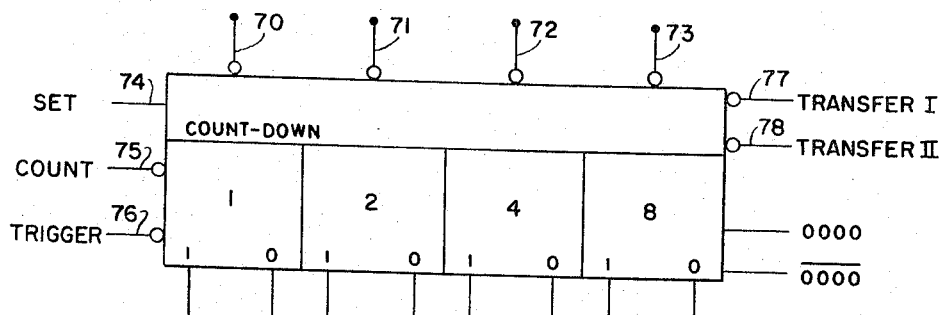
Figure 6:
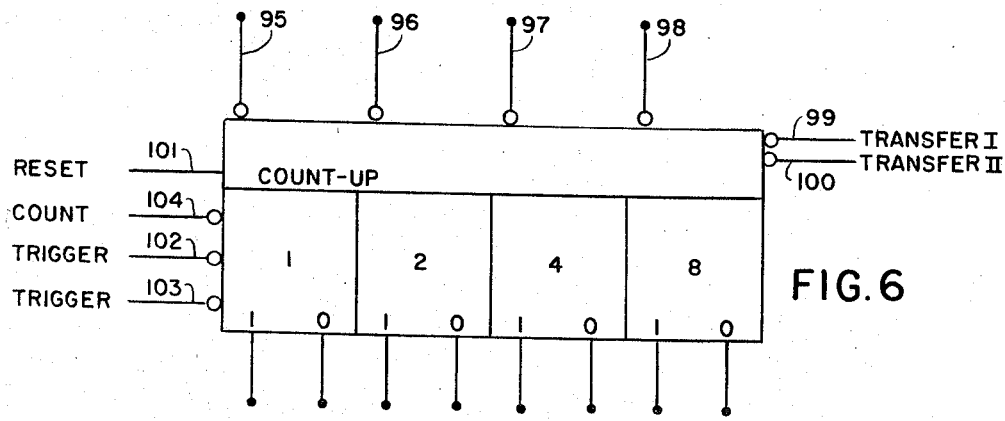

FIGURES 5, 6, and 7 illustrate in logic schematic form several typical formations of flip-flops and NOR gates used to develop counting circuits. The specific formations illustrated are merely by way of example and should not be construed as limitations on the invention. In fact, other suitable means of developing counters of the nature described for incorporation in the positioning control system may be created. Except in specific instances, the particular binary-coded-decimal weighting employed in the counters need not be followed, provided the necessary modifications in cooperating circuitry are made.

A detailed description of the operation of each of the illustrated counting circuits will not be made. It is believed that the preceding explanation of NOR gate and flip-flop circuit functioning is ample to acquaint the reader with the symbolism used herein. Consideration of the functioning of these individual circuts and the effect of this functioning on associated circuitry will render operation of the illustrated counters self-explanatory. Nevertheless, several comments may be made concerning the specific counter circuits and the generic symbols used to represent each decade.

FIGURE 5 shows the symbol used for a binary-coded-decimal count-down decade wherein the four binary stages are weighted 1-2-4-8. This counter is adapted to receive input pulses on a plurality of input leads 70, 71, 72, and 73. The stages associated with each of these leads will be reset, i.e., placed in a zero state, when a logic 0 is applied thereto. Prior to presetting information into the decade it is set to register a "1111" permutation of states by applying a logic 1 to set (S) lead 74. Counting in a successively decreasing or subtractive direction occurs when the count (C) lead 75 has a logic 0 thereon and trigger pulses are applied to trigger (T) lead 76. Transfer of input information from input leads 70 through 73 into their respective stages takes place only when a logic 0 is simultaneously applied to the transfer I (TR) and transfer II (TR) control leads 77 and 78. The output leads connected to the "1" and "0" outputs exhibit a logic value representative of the state of their respective stages.

In the following circuit description, it will be appreciated that each binary stage of a binary-coded-decimal counter is representative of a particular decimal digit. For convenience in determining the permutation of states exhibited following each count input, the digits represented are noted in the appropriate blocks. Thus, in the illustrated 1-2-4-8 counter of FIGURE 5, the decimal digits 1, 2, 4, and 8 appear in successive blocks from left to right.

An additional factor of circuit symbology should be noted with respect to the symbols for a counter, as exemplified in FIGURE 5. The small circles appearing on particular input leads indicate that the operative signals applied to these leads must be of the logic 0 state. In the absence of such circles, it is to be understood that the operative signal is of a logic 1 state. Further, an output is available from the countdown decades when all stages thereof are in a zero state. This output is symbolically represented at the lower right hand portion of the symbol by two leads 0000 and $\overline{0000}$. When the counter registers a decimal zero, a logic 1 is available at the 0000 terminal. A logic 0 is available at the $\overline{0000}$ terminal. These signals may then be employed to actuate cooperating circuit means.

Figure 5A:
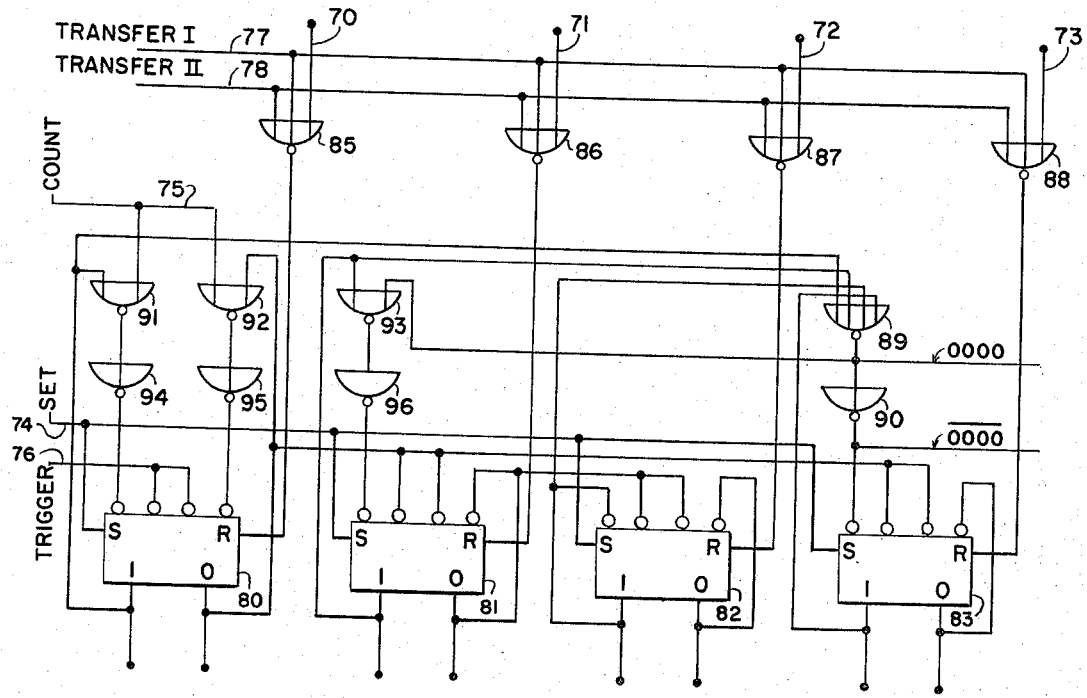

FIGURE 5A is a logic schematic drawing of the elements which may be used to develop a count-down decade of the nature described. This decade comprises four-flip flops 80, 81, 82, and 83. It includes a pair of steering input NOR gates 91, 92, followed by inverters 94 and 95, respectively, for rendering the first flip-flop 80 responsive to change its state each time a count pulse on lead 75 is followed by a trigger pulse on lead 76. A NOR gate 93 followed by an inverter 96 is appropriately coupled to restrict the four bistable stages to decimal counting. A NOR gate 89 followed by an inverter 90 is also used in restricting the counter to decimal counting and because the inputs thereof are connected to the "1" output terminals of each stage it provides a logic 1 output when the counter registers 0000. Inverter 90 provides the inverse output $\overline{0000}$.

The function of setting the counter by logic 0 signals appearing on the input leads 70, 71, 72, and 73 is implemented by NOR gates 85, 86, 87, and 88, respectively, which are connected to provide discrete 1 outputs when an input lead and both transfer leads 77 and 78 have a logic 0 applied.

FIGURE 6 illustrates the symbol used for a binary-coded-decimal count-up decade having stages weighted 1-2-4-8. As in the case of the previously described down-counter, the count-up counter is set by the application of logic 0 signals to the input terminals 95, 96, 97, and 98 simultaneously with the application of a logic 0 to transfer terminals 99 and 100. Before presetting the decade it is reset by the application of logic 1 to reset terminal 101. In operation, the application of triggering impulses to either trigger 102 or trigger 103, subsequent to the application of a logic 0 on count terminal 104 will modify the permutation of states in an upward direction by one decimal count.

Figure 6A:
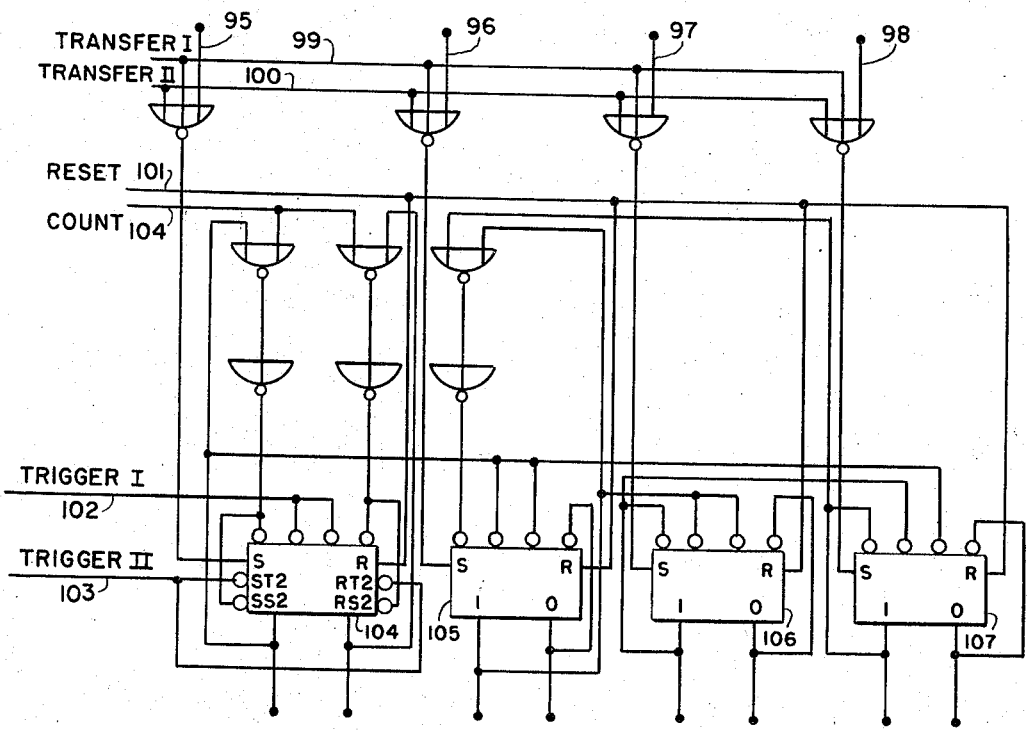

FIGURE 6A is a logic schematic illustrative of the manner in which four flip-flops 104, 105, 106, and 107 may be combined with logic NOR gates and inverters to produce a count-up decade of the nature described. No further explanation is deemed necessary for an understanding of such a count-up decade.

FIGURE 7 illustrates the symbol used for a count-up binary-coded-decimal decade having stages weighted 1-2-4-5. In general, this decade is very similar to that shown in FIGURE 6. It differs in that only a single trigger input 117 appears and only a single transfer input 114 is used. Also, of course, the interconnection of the actual logic elements is different in view of the fact that different weighting is given to each of the binary stages.

In this counter, it will also be apparent that input logic 0 signals applied to terminals 110, 111, 112, and 113 will operate to set their respective binary stages if a logic 0 is present on transfer lead 114. The application of logic 1 to reset terminal 115 prior to presetting insures that all stages initially are in a zero state. During the counting operation when a trigger pulse is applied to trigger 117 during the application of a logic 0 to count input 116, the number registered in the counter will increase by one decimal digit. An output 118 designated 0011 is available from this count-up decade. It will be recognized that this permutation of binary states represents the decimal digit 9 in the particular binary-coded-decimal system being employed. Thus, output lead 118 will exhibit a logic 1 when the counter registers a decimal count of 9.

FIGURE 7A illustrates how four flip-flops may be utilized with a plurality of NOR logic gates and inverters to fabricate a counter such as symbolized by FIGURE 7. It will be noted in this figure that the 9 output signal is developed by means of a NOR gate 119 having the two inputs thereof connected to the "0" output leads of the last two flip-flop weighted 4 and 5, respectively.

With the foregoing discussion of the various symbols and sub-circuits used, the following detailed discussion of a circuit specifically designed to carry out the features of the invention will be clear.

Logic circuit schematic

The logic circuit schematic contained in FIGURES 8 through 13, when placed in accordance with the sheet layout of FIGURE 13A, represents one means of carrying the invention into effect. The functions of the major sub-circuits used in the over-all schematic have already been considered. For purposes of orientation within the circuit schematic itself, the correlation between the block schematic of FIGURE 2 and this more detailed circuit drawing will be explained.

Figure 10:
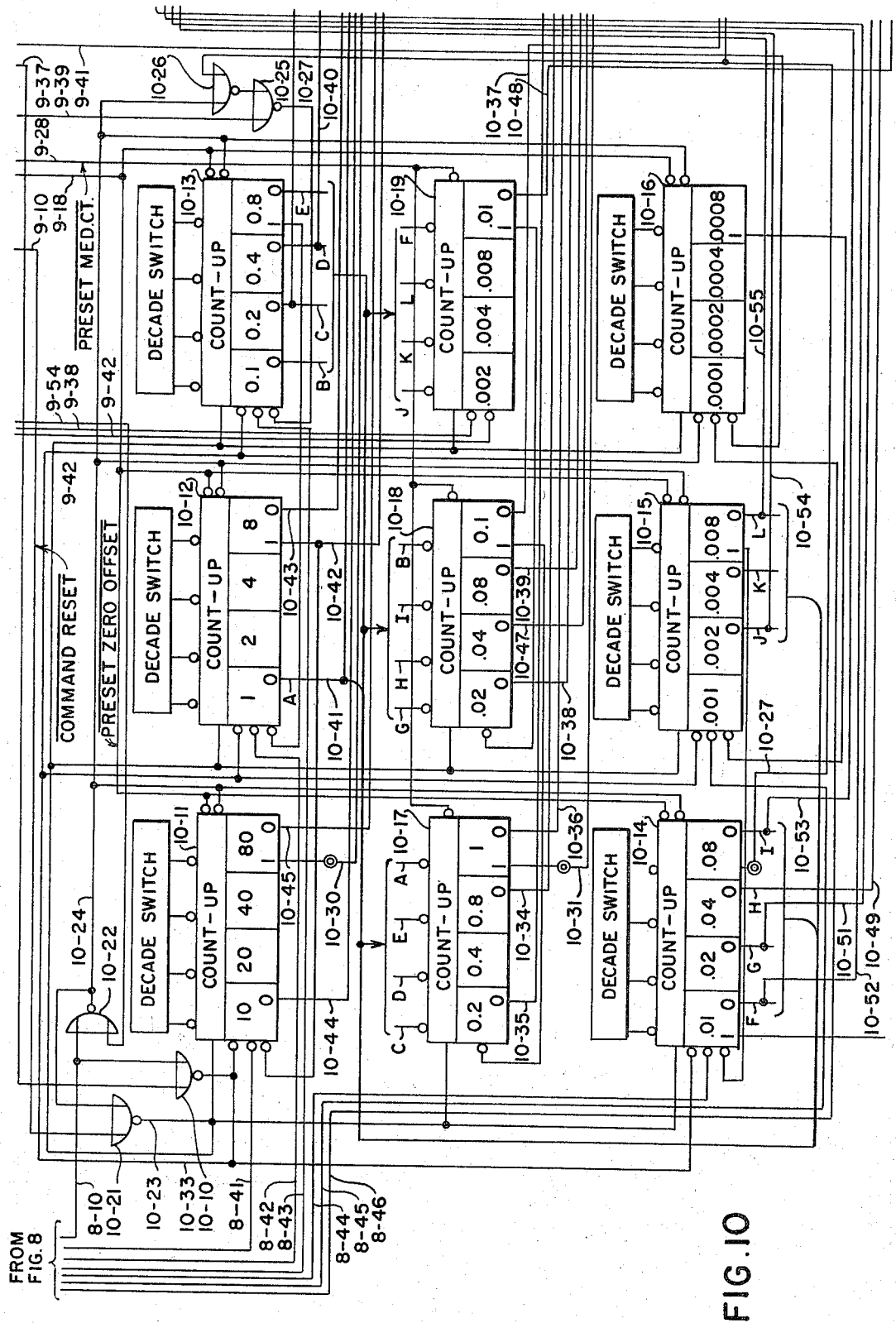

In the circuit drawing, FIGURE 8 contains the input equipment 8–31 through 8–34, the read-in counter 8–21, and the row counter and distributor, represented in FIGURE 2 by blocks 31, 32, 33, 34, 21, and 35, respectively. FIGURE 9 contains the reference pulse generator 9–RPG, the pulse rate divider 9–PRD, and a plurality of gates and flip-flops which cooperate with sequence control circuit 34. FIGURE 10 contains the three command phase counters 10–11 through 10–19 with associated circuitry for generating the coarse, medium, and fine components of the command signal. FIGURES 11 and 12 contain the end zone comparators for the coarse and medium signal components, the feedback resolvers 11–43, 11–44, and 11–45, the phase discriminator, and the output circuitry for control oxer the X axis feed mechanism 12–13. FIGURE 13 contains the control relays for initiating circuit operation and governing the circuit functioning.

In a control system of the type illustrated, three modes of operation are possible; a manual mode, a semi-automatic mode, and a fully automatic mode. Only the semi-automatic and automatic modes will be described hereinafter. In light of the teachings herein, it is within the skill of those in the art to utilize the system in a manual mode.

Information read-in (automatic operation)

Because the automatic mode of operation in general employs most of the elements operating in their normal manner, it will be described first. Thereafter, the manner in which the semi-automatic mode of operation differs, will be described.

The operating mode is selected by properly positioning the "mode selector switch" shown in FIGURE 13. This switch positioning energizes either the automatic mode relay 13–ATO, the manual mode relay 13–MAN, or neither. If neither of these relays is energized, the semi-automatic relay 13–SEM operates in a circuit including the normally closed contacts 13–ATO and 13–MAN.

To begin operation, the "cycle start" switch is actuated and, depending upon the operating mode selected, selected circuitry of FIGURES 8 through 12 is called into operation. A specific consideration of further relay operation during functioning of the control system is not necessary at this time. As events occur which may require an appreciation of the condition of particular relays, these conditions will be noted.

Upon actuation of the cycle start switch, information from the input data equipment is read into the control section for a particular axis feed mechanism in response to the identification of a block of data as representing the command information for that control section. As previously pointed out, each axis command comprises a letter address and a series of decimal characters denoting the position the apparatus is to assume.

FIGURE 14 shows a typical strip of tape such as might be used to provide the input information in the instant automatic control system. This tape comprises eight channels. The first four channels are used to designate either a number or letter in binary-coded form. The fifth channel is used to establish a parity bit in order to insure accurate reading. The zero digit is represented by a single punch in the sixth channel. Alphabetic characters are represented by holes punched in various combinations in channels 1 through 4 plus combinations of punches in channels 6 and 7. The eighth channel is used to generate a signal at the end of each block of information. In general, a block of information contains all of the information necessary to perform one operation. It may contain positioning information only, positioning information and auxiliary information, or auxiliary information only. As illustrated in the figure, the tape is of a punched form wherein a punch indicates the presence of a logic one for the element of the binary character represented.

During reading, the tape is placed adjacent to a reading head, or plurality of reading heads, and the presence or absence of a hole is detected in each channel. Appropriate signals are generated by the tape reader in accordance with the hole configuration. After each reading operation is completed, the tape is stepped to the next row of data and the identical sequence of events ensues.

In the sample strip of tape shown, a plurality of decimal digits are encoded in successive rows following the address code for the X section of the control system. The punch indications appearing in the fifth column will be seen to make each row present an odd number of holes. As well known, this technique permits parity check by providing that an odd number of holes must be detected in order to insure accurate reading. It will be noticed hereinafter that provision has not been described for utilizing this parity check information. It is obvious to those skilled in the art of tape control to utilize a number of techniques for recognizing parity errors and controlling systems in accordance with this recognition.

For brevity and clarity of description, the actual tape reading equipment has been illustrated by the blocks in FIGURE 8 in accordance with particular functions performed in the tape reading apparatus. Thus, the tape reader is represented by block 8–31. Four outputs from this tape reader, which represent the first four character channels of the tape, are connected directly to the countdown read-in counter 8–21. A fifth output on lead 8–28 is energized by recognition of the end-of-block signal on the tape. These channels, and others from the tape reader, are connected respectively to the number recognition circuitry 8–32, the address recognition circuitry 8–33, and the sequence control circuitry 8–34. The latter blocks represent the functions required to steer the input data to appropriate sections of the control system.

Address recognition circuit 8–33 operates to detect the presence of a letter character and generate signals in accordance therewith. For example, when the X address is detected, a signal is applied to lead 8–10 which is effective to initiate reset of the command phase counters in the X control section and to prepare this control section for generating the phase coded X axis command signal.

Number recognition circuit 8–32 is operative each time the encoded character is a number to generate a signal on lead 8–11 which sets a row counter advance flip-flop 8–RCA and thereby begins directing successive numbers as they are read from the tape reader into appropriate decades of the command phase counters appearing in FIGURE 10.

Sequence control circuit 8–34 may be operated in response to detection of signals appearing on the tape, or may be synchronized with the reading equipment and operated to generate signals having a specific time sequence. In any event, the output from the sequence control circuit 8–34 supplies signals which are operative to initiate or terminate particular operations within the control section selected by address recognition circuit 8–33. In view of the plurality of ways in which the sequence control signals may be generated, and because the particular technique is not relevant, FIGURE 15 presents a timing diagram showing the relative instants of time at which the required sequence control signals might be generated in a typical case. In this timing diagram, particular operations or signals are illustrated with reference to the time and period of occurrence. The first operation indicated, "Read," shows the period of time during which characters are read from the tape. The subsequent lines, designated "T1," "T2," "T3," and "T4," represent the periods of time during which timing signals T1, T2, T3, and T4 are generated. The timing diagram covers a complete cycle of a single reading operation. This cycle may be assumed to represent a period of 50 milliseconds; the period being selected in order to render the generation of timing sequence signals compatible with the selected frequency of operation hereinbefore assumed. As the description proceeds, it will become apparent that the sequence signals are effective to control the preparation of the command phase counters for receipt of information, the subsequent read-in of the information, and the initiation of the operation of generating the multi-component phase-coded command signal.

In the automatic operating mode, the coarse and fine command phase counters are first preset by zero offset data representing the reference point to be used for a particular operation. The command position data representing the apparatus position for that operation is then added to the zero offset data. Once the coarse and fine command phase counters have registered the complete complement of input information, the medium command phase counter is preset in accordance with the information contained in the coarse and fine counters. When the entire command phase counter group has been properly preset, generation of phase-coded command signals proceeds.

It has already been noted that the command position data may be encoded upon punched tape. The zero reference data, however, should be conveniently changeable for each operation or workpiece location. In order to obtain this flexibility, the present unique technique includes the use of manually set switches which are operative to convert a decimal digit into the appropriate binary form for control of the various decades of the command phase counters. Any number of types of switches may be employed; however, a particularly adaptable type is diagrammatically illustrated in FIGURE 16. The switch represented by FIGURE 16 includes a stationary arm 64 upon which four electrically isolated contacts are mounted. A rotatable chassis having a conducting surface 65 which is tied to a zero potential point, is arranged to establish connections with the contacts. A plurality of nonconductive strips 66 are arranged in a pattern to provide a plurality of logic signals upon the outputs 67 which are connected to the stationary contacts. The logic signals represent in binary-coded form the complement of a binary-coded decimal digit. The binary-coded decimal digit, in turn, represents the desired zero offset for the particular decade involved. The combination of logic signals presented on outputs 67 for each of the ten possible switch positions is shown in FIGURE 16A.

In the particular circuit embodiment illustrated herein, six switches of the type shown in FIGURE 16 are used to preset zero offset information into the command phase counters. Each switch supplies input data to one decade of either the coarse or fine command phase counter. The "weight" the setting of a particular switch is allocated, is determined by the decade with which it is associated. The reason the switches yield data in complementary form is because this renders it compatible with the nature of the command phase counters used.

*Presetting zero reference data*

The sequence of the operations for inserting the zero reference data into the command phase counters will now be considered.

FIGURE 18 is a timing diagram which shows the relative time of occurrence of several sequence control signals and the circuit operation in response thereto. The relative time of occurrence of several of the reference clock pulses and outputs from particular stages of reference pulse rate divider 9–PRD are also shown. The waveforms are drawn as having two logic states, "1" and "0." This represents actual voltage levels of zero and +6 volts.

When a letter is detected by letter recognition circuit 8–33 the row counter is reset in preparation for reading a new word. Thereafter, depending upon the axis of motion the input data is meant to control, the command phase counters are reset and the zero reference data is preset therein.

Upon detection of a letter, letter recognition circuit 8–33 applies a logic 1 reset signal over lead 8–33 to reset flip-flops 8–RC1, 8–RC2, and 8–RC4 of the row counter. Due to this resetting operation, a logic 0 signal appears at the "1" output of each of these flip-flops. Gate 8–50, in the upper right corner of FIGURE 8, has three inputs. These inputs are associated with the "1" output of the aforementioned row counter flip-flops. Consequently, when they are reset, there is a unique complement of inputs to gate 8–50 which produces a logic 1 at the output thereof. This signal is inverted by inverter 8–60 and applied over lead 8–12 as an input to gates 9–14 and 9–15 on the right side of FIGURE 9. The other inputs to these gates are the sequence control signals T3 and T4, respectively. Thus, gates 9–14 and 9–15 are enabled to produce logic 1 outputs upon occurrence of sequence control signals T3 and T4.

Referring to FIGURE 15, it will be seen that the sequence control signal T3 is the first of these two signals to occur after detection of the letter. At this time gate 9–14 supplies a logic 1 output which is effective via gate 9–16 to apply a logic 0 upon lead 9–10 and thereby initiate reset of the command phase counters appearing in FIGURE 10. The command reset signal is illustrated in FIGURE 18 by the waveform labeled "command reset."

The command reset signal is applied to one input of gates 10–21 on the upper left of FIGURE 10. The other input of gate 10–21 is used to select the proper command sub-section. Thus, when the letter address for the X-axis is recognized, a logic 1 is generated by address recognition circuit 8–33 on lead 8–10. This is applied to an input of gate 10–22 in the left corner of FIGURE 10. In response to this conditioning of its input, gate 10–22 yields a logic 0 at its output and this is applied via lead 10–24 to the second input of gate 10–21. The concurrent occurrence of the command reset signal on lead 9–10 and the logic 0 signal on lead 10–24 is effective to generate a logic 1 at the output of gate 10–21. This output is connected via lead 10–23 to the reset terminals of each of the decades in the command phase counter group. As described in conjunction with the description of the up counters of FIGURES 6 and 7, the application of a logic 1 signal to the reset terminals resets all of the stages thereof to a zero state.

Shortly after the generation of the command reset signal, the sequence control signal T4 causes the generation of a preset zero offset signal. As mentioned above, the simultaneous application of the logic 0 on lead 8–12 and the sequence signal T4 on lead 8–14 causes gate 9–15 to produce a logic 1 output. This, in turn, causes the generation of a logic 0 at the output of connected gate 9–17. The logic 0 upon the output of gate 9–17 is applied via lead 9–18 to a transfer input of the coarse and fine command phase counters in order to enable transfer of the data stored in the zero offset switches into their respective command phase counters.

The other transfer input of each counter decade must also be a logic 0 in order to permit transfer. It is so conditioned due to the presence of a logic 0 on conductor 10–24 as has already been noted in conjunction with the generation of the command reset signal.

In recapitulation, it will be seen that upon generation of the sequence control signals T3 and T4 and the recognition of the address of one of the control sections, a command reset signal is generated which prepares all of the command phase counters within that control section for receipt of new data. Thereafter, a preset zero offset signal is generated which causes the transfer of preselected zero offset information into the appropriate decades of the command phase counter group. It now remains to insert the command position data into these counters and to generate the multi-component phase-coded command signals.

Although the illustrated embodiment shows one set of zero reference data switches, it will be appreciated that the number of sets of switches is not limited. By including simple gating means operative in response to a particular tape address or in response to manual selection means, any number of sets of switches may be incorporated in the control system. In this way, a multiplicity of reference points may be made available as desired.

*Presetting command data*

Whenever a letter is detected by recognition circuit 8–33 it generates a logic 1 reset signal on lead 8–13 that resets the row counter flip-flops 8–RC1, 8–RC2, and 8–RC4. Further, recognition circuit 8–33 generates a discrete signal indicating the particular letter detected. Thus, because we have assumed an X-axis command, a logic 1 signal is generated on lead 8–10 indicating that the X address has been read. This signal was used to prepare the X-axis control section and enable transfer of the zero offset data into the coarse and fine command phase counters in FIGURE 10. It is also used to permit the count-in of command information into the command phase counters.

After the X address is read, the tape moves one step and the next character is brought under the reading heads. Reference to the sample tape in FIGURE 14 shows that this character is the first decimal digit of the command signal. Sequence circuit 8–34 again generates the control signals illustrated in FIGURE 15 and in response to signal T1 on lead 8–15, a logic 0 transfer signal is applied to read-in counter 8–21. The binary-coded-decimal values impressed on the input leads of counter 8–21 are therefore transferred into the counter, setting it in accordance with the binary-coded-decimal digit appearing in the first row of the tape.

The timing signal T1 is also applied via leads 8–15 and 8–16 to number recognition circuit 8–32. In view of the fact that a number has been detected, the timing signal causes recognition circuit 8–32 to generate a logic 1 on lead 8–11 which is effective to set the row counter advance flip-flop 8–RCA. Flip-flop 8–RCA functions to supply a counting pulse to the row counter flip-flops immediately prior to the setting of each digit of command data information into the command phase counters. Thus, upon setting thereof, the logic zero appearing at the "0" output is applied as a trigger input to row counter flip-flop 8–RC1. With row counter flip-flop 8–RC1 set and flip-flop 8–RC2 and 8–RC4 reset, gate 8–51 in the upper right portion of FIGURE 8 has a logic 0 signal applied to three inputs. The fourth input to this gate on lead 8–24 will periodically present a logic 0 signal and thereby logic 1 output signals will be generated These output signals represent the number stored in the read-in counter 8–21 and are generated in the manner now to be described. Because the signals are passed by gate 8–51 they are directed to the most significant decade 10–11 of the coarse command phase counter.

In addition to setting row counter flip-flop 8–RC1, the logic 0 output from row counter advance flip-flop 8–RCA is applied over conductor 8–17 to one of the inputs of gate 8–18. As flip-flop 8–RCA is set only as a consequence of a number character having been read, gate 8–18 is permitted to have a logic 1 output during the reading of a number only. The other inputs to gate 8–18 are used to synchronize the counting in read-in counter 8–21 and to terminate this counting when it has been reset to zero. The first function is accomplished by means of a read-in synchronizing flip-flop 8–RIS and the second function is accomplished by connecting the 0000 lead, 8–19, to one of the inputs of gate 8–18. Considering first the operation of the read-in synchronizing flip-flop 8–RIS, it will be seen that triggering pulses are applied thereto from the pulse rate divider 9–PRD appearing in FIGURE 9.

The pulse rate divider consists of three decades of upcounters of the nature described hereinbefore. The first decade has binary stages weighted 1-2-4-8 and the second two decades have binary stages weighted 1-2-4-5. It will be obvious that the use of three decades is effective to divide the applied input pulses by one thousand. Since the input is supplied by the 250 kc. reference pulse generator 9–RPG, the output from the last stage has a pulse repetition rate of 250 cycles per second. Also, a number of different pulse repetition frequencies are available at the individual stages of the pulse rate divider for use in accomplishing various control functions.

The output of 9-RPG is applied via inverter 9-11 to the trigger input of the first decade 9-PRD1 of the pulse rate divider and in response to this input, the pulse rate divider begins counting. It will be appreciated that the output of each stage of the pulse rate divider is some fraction of the input pulse rate. Thus, the output from the first stage of the first decade 9-PRD1 is a square wave having a frequency of 125 kilocycles per second and the output of the second stage has an average frequency of 50 kilocycles per second with a peak frequency of 62.5 kilocycles per second. This latter output is used to count down the read-in counter 8-21 and supply a number of triggering pulses to the command phase counters equal to the number originally registered. As shown in FIGURE 9, the "1" output of the second stage of decade 9-PRD1 is connected by lead 9-12 to the set trigger input of read-in synchronizing flip-flop 8-RIS and the "0" output of the second stage is connected by lead 9-13 to the reset trigger input thereof.

The set steering input of flip-flop 8-RIS is under the control of T3 signals applied via lead 8-20 from sequence control circuit 8-34. The "0" output of this flip-flop is connected to the reset steering input. These connections, in cooperation with the alternate application of pulses to the set trigger and reset trigger terminals from the pulse rate divider in FIGURE 10 cause flip-flop 8-RIS to alternately assume set and reset states at an average frequency of 50 kc. during the period that a logic 0 is applied over lead 8-20. This condition exists when timing signal T3 is being applied.

Each time flip-flop 8-RIS is set, a logic 0 signal is applied via lead 8-22 to an input of gate 8-18. As previously noted, when the read-in counter 8-21 registers a number other than zero and a number has been recognized by number recognition circuit 8-32, the other two inputs to gate 8-18 will also be at logic 0 and a logic 1 will be presented at the output thereof. Inverter 8-23 converts this logic 1 to a logic 0 and it is applied over lead 8-24 to the row counter gates vertically disposed across the right hand portion of the figure. At the same time, this logic 0 signal is applied via lead 8-25 to the count input of read-in counter 8-21.

It will be recalled from FIGURE 5 that a change to a logic 0 at the trigger input after a logic 0 has been applied to the count input of a down counter will be effective to decrease the number registered therein by one decimal digit for each signal applied to the trigger input. Thus, read-in counter 8-21 commences counting down under the influence of logic 0 signals from the second stage of 9-PRD1 via leads 9-13 and 8-26, and from read-in synchronizing flip-flop 8-RIS via gates 8-18, 8-23, and lead 8-25.

The application of pulses to the count and trigger inputs of read-in counter 8-21 is effective to successively reduce the count therein until all stages are in a zero state. At this time, a logic 1 is presented at the 0000 output thereof on conductor 8-19 and this disables gate 8-18. Upon disablement of gate 8-18, the pulses originally passed therethrough from read-in synchronizing flip-flop 8-RIS are blocked. During the period that timing signal T3 is applied to the read-in synchronizing flip-flop and read-in counter 8-21 registers a number other than zero, logic 0 pulses at an average repetition rate of 50 kilocycles per second are applied over lead 8-24 to the row counter output gates. Thus, the number of such pulses is equal to the number originally registered in read-in counter 8-21 in response to the command input data.

When the first digit is being read the logic 0 signals applied to lead 8-24 are passed through gates 8-51 and 8-61 and via lead 8-41 to one of the trigger inputs of the most significant decade 10-11 of the coarse command counter. The function of the row counter output gates 8-51 through 8-56 is to direct the pulses generated by read-in synchronizing flip-flop 8-RIS to the appropriate decade of the command phase counter group. This is accomplished by selectively gating the input pulses to one of the trigger inputs of the decade assigned for storage of the decimal number represented by the input data. The outputs 8-41 through 8-46 of the inverters connected to the row counter gates are connected to the trigger inputs of the coarse and fine command phase counters only, because the counters have the required six decades for each digit of the input data. The outputs are connected to decades of the command phase counters in a descending order of magnitude. Specifically, outputs 8-41 through 8-46 are connected to the trigger inputs of decades 10-11, 10-12, 10-13, 10-14, 10-15 and 10-16 respectively.

As explained in conjunction with the description of the up counters in FIGURES 6 and 7, the application of these triggering pulses in coincidence with count pulses is effective to increase the count registered by the individual command phase counters by the number of trigger pulses applied. Thus, the zero offset information already preset in the counters is increased by the pulses applied via the row counter gates and the total number registered by the command phase counters following this read-in operation is equal to the sum of the command input data and the zero offset data.

As previously noted, if the sum of the input and offset data in any decade exceeds nine there is a carry signal to the next most significant decade. The gate 10-25 interposed between the trigger input of decade 10-13 and the trigger pulses on lead 9-39 in order to provide means for carrying the number counted in the fine command phase counter into the next most significant decade which is in the coarse command phase counter, at the time of data read-in only. This is accomplished with the intervention of gate 10-26 which has as one input thereto, lead 10-27 from the "1" output of the last stage of the decade 10-14 of the fine command phase counter. Obviously when this last decade 10-14 assumes a reset state, indicative of a count of ten, a logic 0 will be applied to lead 10-27. The other input of gate 10-26, as noted hereinbefore, is connected via lead 10-24 to the output of gate 10-22 appearing in the upper left-hand corner of FIGURE 10.

Gate 10-22 applies a logic 0 to lead 10-24 when an X address is detected. Initially, this signalling is used as one of the transfer inputs for transferring zero offset information into the command phase counters. At this stage of operation, the logic 0 on lead 10-24 is used as an input to gate 10-26 in combination with the input on lead 10-27 in order to produce a logic 1 signal for triggering the 10-13 decade of the coarse command counter via gate 10-25.

The row counter flip-flops 8-RC1, 8-RC2, and 8-RC4 which control the row counter gates are connected to form a binary counter. Because there are three bistable stages, the counter is capable of developing a maximum of eight discrete permutations of states. Immediately upon recognition of a letter address, each of the row counter flip-flops is reset by the logic 1 signal applied via lead 8-13 to their reset terminals. Thereafter, they are triggered by the successive setting of row counter advance flip-flop 8-RCA as each number is recognized. Each time a number is read, the row counter increases its registration by one number. The outputs, as represented by the "1" and "0" terminals of each flip-flop, are selectively connected to the gate inputs of the row counter gates 8-51 through 8-56 to enable one gate for each number recognized.

The first numerical character detected causes row counter advance flip-flop 8-RCA to be set. The effect of this setting operation upon read-in synchronizing flip-flop 8-RIS, read-in counter 8-21, and row counter flip-flop 8-RC1 has already been considered. The connection of flip-flop 8-RC1 as a counter insures that it will be set upon application of the first trigger impulse from flip-flop 8–RCA and a logic 1 is generated at the "1" output and a logic 0 is generated at the "0" output. The succeeding stages 8–RC2 and 8–RC4 of the row counter remain in their reset states and, therefore, the only row counter gate which is capable of being enabled by the subsequently appearing logic 0 signals on lead 8–24 from the read-in synchronizing flip-flop 8–RIS, is gate 8–51.

After reading each row of data, a timing signal T4 is generated by sequence control circuit 8–34. This signal is applied over lead 8–14 to reset read-in counter 8–21 to register 1111 in preparation for presetting the subsequent numeral data character therein. It is also applied over leads 8–14 and 8–27 to reset row counter advance flip-flop 8–RCA. When a second numerical character is read, flip-flop 8–RCA is again set and the logic 0 signal on the "0" output thereof triggers flip-flop 8–RC1 to a reset state. Upon resetting, flip-flop 8–RC1 generates a logic 0 signal on the "1" output thereof, and thereby sets flip-flop 8–RC2. The setting of flip-flop 8–RC2 and resetting of flip-flop 8–RC1 established a new permutation of outputs from the row counter which will enable gate 8–52 to pass the following count input pulses to the second most significant decade 10–12 of the coarse command phase counter. This sequence of operations continues as each character is read until all six command digits have been read into the coarse and fine portions of the command phase counter group.

*Presetting medium command phase counter*

Once the complete block of command data has been read into the coarse and fine sections of the command phase counter group it is necessary to preset the medium command phase counter.

Each decade of the coarse and fine command phase counter group registers a particular decimal digit of the commanded position. Because binary-coded-decimal counters are used the decimal digit may be considered to comprise individual components having relative weights determined by the binary code adopted. A counter is considered to register the decimal number whose value is determined by adding the weighted value of all stages in a set condition. The weighted decimal value of each stage of the command phase counter group is indicated in the symbols used.

Decade 10–13, which is typical, registers the third digit of the command. This is the least significant digit in the coarse command phase counter. The stages of this decade are labeled .1, .2, .4, and .8 indicating that the digit registered is the "tenths" digit of the command. The particular tenths digit registerd is determined by adding the labeled value of each stage that is set.

As shown in FIGURE 10, the input to the medium command phase counter are selectively connected via leads A through L to the "0" outputs of the stages in the coarse and fine command phase counters having the same weighted decimal value. Thus, the stages of the coarse or fine command phase counters which reside in a set state will set like stages of the medium command phase counter when the transfer leads are properly energized.

It is important to recognize that the full decimal range of the medium command phase counter is 2. This range corresponds to a commanded position of 2 inches and has been selected to permit the development of a system wherein the ratio between the feedback resolvers is less than 100:1, but greater than 10:1. In order to develop an intermediate range command component which is not related to either the coarse or fine component by a factor of 10, means have been uniquely devised whereby the weighted decimal values of particular binary stages are used, regardless of the decade in which the stages reside.

In the embodiment shown, the medium command phase counter is made up of counters having binary stages weighted 1–2–4–5, whereas the coarse and fine command phase counters are composed of counters having binary stages weighted 1–2–4–8. The weighted decimal value of a stage in the medium command phase counter is established at twice the weight of the stage. Thus, the decimal weighting of the stages of the most significant decade 10–17 is .2, .4, .8, and 1. The maximum number this stage can register is 1.8.

The selected decimal weighting of the stages of the medium command phase counter is compatible with the decimal weighting of the stages of the coarse and fine command phase counters, in that similar digits are represented within each counter even though not within common decade groups. The selective interconnections required to develop an intermediate command component are illustrated by the inputs G, H, I, B to the second most significant decade 10–18 of the medium command phase counter. Input B is derived from the least significant stage of the least significant decade 10–13 of the coarse command phase counter. Inputs G, H, and I are derived from the three most significant stages of the most significant decade 10–14 of the fine command phase counter.

The transfer signal on lead 9–28 which effects setting of the medium command phase counter is generated when the end-of-block signal is detected on the tape. Gate 9–26, appearing in the lower right of FIGURE 9 imposes the conditions: (1) that the end-of-block flip-flop 9–EOB is set; (2) that the "4" stage of pulse rate divider decade 9–PRD2 is set; and (3) that the command-count-trigger flip-flop 9–CCT is reset. The first condition insures completion of the read-in operation from the input equipment. The second condition is significant from an operating sequence timing point of view. The third condition insures that additional generation of a transfer signal will not occur after the command signal generation has started.

Obviously, during each cycle of 1000 pulses from reference pulse generator 9–RPG, stage 4 of decade 9–PRD2 will assume a set state a number of times. The operative factors in developing the preset medium command phase counter are primarily the set condition of flip-flop 9–EOB and the reset condition of flip-flop 9–CCT. In order to determine the condition of flip-flop 9–CCT it is necessary to examine the condition of the end-of-block relay 9–EOB and associated circuitry during the period of read-in from the input equipment to the coarse and fine command phase counters.

End-of-block flip-flop 9–EOB is reset before starting each data reading cycle. This reset condition results in the application of reset steering signals to command count flip-flop 9–CC each time pulse rate divider 9–PRD counts 1000 input pulses from generator 9–RPG. This is effected via gates 9–20, 9–21, and 9–22. The logic 1 appearing at the "0" output of flip-flop 9–EOB during reset is coupled by inverter 9–20 to one of the inputs of gate 9–21. Every time pulse rate divider 9–PRD attains a count of 9 in each of the decades thereof, a logic 1 signal is presented to the input of inverter 9–23 and this in turn applies a logic 0 to the second input of gate 9–21. Consequently, gate 9–21 generates a logic 1 which is inverted by gate 9–22 and applied as a reset steering signal to command count flip-flop 9–CC. Command count flip-flop 9–CC is triggered directly via lead 9–49 from the output of the reference pulse generator and is therefore reset upon occurrence of the first subsequently occurring pulse.

The command count trigger flip-flop 9–CCT is used to control the supply of counting pulses to the command phase counters. This flip-flop is completely controlled by command count flip-flop 9–CC. Prior to actual counting, as long as the command count flip-flop is reset, it maintains the command count trigger flip-flop 9–CCT reset. This is accomplished by interconnecting the "1" output of flip-flop R–CC via gate 9–24 to the reset input of flip-flop 9–CCT. An additional input to gate 9–24 via lead 9–19 supplies reference pulses from reference pulse generator 9–RPG and, therefore, whenever the command count flip-flop is reset, both inputs to the gate 9-24 will be zero and a logic 1 will be applied to command count trigger 9–CCT to reset it. On the other hand, the "0" output of flip-flop 9–CC is applied via a gate 9–25 to the set input of flip-flop 9–CCT. An additional input to gate 9–25 supplies reference pulses from reference pulse generator 9–RPG. Thus, each time the command count flip-flop 9–CC is set, a logic 1 will be applied to set the command count trigger 9–CCT.

In view of the described circuitry, it will now be apparent that during read-in of information from the input equipment to the coarse and fine command phase counters, command count trigger flip-flop 9–CCT will be in a reset state. While reset, flip-flop 9–CCT applies a logic 0 signal from its "1" output to one of the inputs of aforementioned gate 9–26. This conditioning means that a preset medium command phase counter signal will be generated when flip-flop 9–EOB is set.

The end-of-block flip-flop 9–EOB is triggered via 9–64 by pulses from the "0" output of the last stage of pulse rate divider decade 9–PRD2. These pulses occur with a repetition rate of 2.5 kilocycles per second. Upon detection of the end-of-block signal by the tape reader, gate 9–29, in the center portion of FIGURE 9, receives a full complement of logic 0 inputs. These inputs comprise the end-of-block signal appearing on lead 8–28 from tape reader 8–31 and timing signal T3 appearing on lead 8–20 from sequence control circuit 8–34. The logic 1 appearing at the output of gate 9–29 is inverted by gate 9–31 and a logic 0 signal is applied to the set steering input of end-of-block flip-flop 9–EOB. Upon occurrence of the next triggering pulse from the second decade 9–PRD2 of the pulse rate divider, the end-of-block flip-flop is set.

When set, end-of-block flip-flop 9–EOB produces a logic 1 at the "1" output thereof which is applied via gate 9–32 to one of the inputs of aforementioned gate 9–26. This provides a full complement of logic 0 inputs to gate 9–26 and the preset medium counter signal is applied to the transfer leads of the medium counter decades via inverter 9–27 and lead 9–28. In response to this signal, the medium command phase counters are set.

All command phase counters are now preset and generation of the phase-coded command signal may begin.

*Generating phase-coded command signals*

The setting of end-of-block flip-flop 9–EOB is effective to initiate not only the presetting of the medium command phase counter but, subsequently, to enable the setting of command count flip-flop 9–CC which initiates counting in the command phase counters. The setting of flip-flop 9–EOB sets command count flip-flop 9–CC upon the next occurring termination of a count of 1000 in pulse rate divider 9–PRD. The circuitry for accomplishing this setting includes gates 9–20, 9–33, 9–34, and 9–35. When flip-flop 9–EOB is set, a logic 0 is generated at the "0" output thereof which is applied via inverters 9–20 and 9–33 to an input of gate 9–34. The other input of gate 9–34 is connected via lead 9–36 to the output of inverter 9–23. It will be recalled that inverter 9–23 provides a logic zero pulse upon a registration of the decimal digit 999 in pulse rate divider 9–PRD. Thus, upon occurrence of the aforementioned count in the pulse rate divider, gate 9–34 has a full complement of logic 0 inputs and produces a logic 1 output for inversion by gate 9–35 and application to the set steering input of the command count flip-flop. On the subsequent occurrence of a reference pulse from generator 9–PRG via lead 9–49 to the trigger input of this flip-flop, the command count flip-flop 9–CC is set. When flip-flop 9–CC is set, the next occurring logic 0 state of the $\overline{250 \text{ kc.}}$ signal on lead 9–19 sets flip-flop 9–CCT. This will occur at substantially half the time to the next 250 kc. pulse.

The count inputs of the coarse and fine command phase counters are enabled by connecting the logic 1 appearing at the "1" output of flip-flop 9–CC via lead 9–37 and gate 10—10 to these inputs. The logic 0 output of gate 10—10 is directly applied to the count inputs of each of the decades of the coarse and fine command counters. It will be recalled that counting was previously enabled during preset of the coarse and fine command phase counters by energizing input leads 8–10 of the gate 10—10 from the address recognition circuit 8–33.

Of course, the medium command phase counter must also be enabled to count. This is expedited by applying the logic 0 signal on the "0" output of flip-flop 9–CC via lead 9–38 to the count input of the least significant decade 10–19 of the medium command phase counter.

Setting command count flip-flop 9–CC is also effective to control the Y axis control circuitry when required; however, inasmuch as the same techniques are used, this has not been illustrated herein.

The 250 kilocycle per second triggering impulses for the coarse and fine command phase counters are gated to the trigger input of the least significant decades thereof when the command count trigger 9–CCT is set. The medium command phase counter receives similar triggering pulses directly from the reference pulse generator 9–RPG over lead 9–42. The setting of flip-flop 9–CCT generates a logic 0 at the "0" output thereof which is effective via gate 9–36 to gate succeeding pulses from reference pulse generator 9–RPG on lead 9–49 to the trigger inputs of the coarse and fine command phase counters. In the case of the fine command phase counter, the recurring logic 1 signals appearing at the output of gate 9–36 are inverted by a gate 9–40 and applied over lead 9–41 to the trigger input of fine command phase counter decade 10–16. In the case of the coarse command phase counter, the successively occurring logic 1 signals at the output of gate 9–36 are applied via lead 9–39 and a gate 10–25, on the upper right of FIGURE 10, to the trigger input of decade 10–13 of the coarse command phase counter.

Logic gate 10–25 permits triggering of the least significant decade of the coarse command counter by means of either count impulses occurring at the reference pulse rate or, at the time of data read-in, by the registration of a ten count in the most significant decade of the fine command phase counter.

In response to the recurring trigger input pulses, each command phase counter chain increases the number registered therein. As the respective counters reach a registration of 1000 counts they reset to zero and continue counting. Upon reset to zero a logic 0 signal is produced at the "1" output of the most significant stage of the most significant decade of each counter. The instant of occurrence of these logic 0 signals with respect to the time at which counting proceeded is commensurate with the numbers preset therein. In other words, the outputs available on leads 10–30, 10–31, and 10–27 are phase-coded signals representing the coarse, medium, and fine components, respectively, of the input command data as modified by the preselected zero offset.

While the command signal is being generated, a signal of similar nature is being generated in response to the actual position of the apparatus. The particular means employed for generating this position signal are represented in FIGURE 11 and will now be considered.

*Generating phase-coded position signals*

Three feedback resolvers 11–43, 11–44, and 11–45 are diagramatically illustrated in the upper left corner of FIGURE 11. These resolvers are of a type well known in the art and comprise a pair of windings that are orthogonally disposed in relation to one another. By applying a sine and cosine wave, respectively, to these orthogonally disposed windings, an output signal is generated in a magnetically coupled winding which has a phase related to the angular position of the rotor. The rotor in each resolver is appropriately geared to the apparatus being positioned to produce a particular amount of rotation in response to linear translation of the apparatus. As previously noted, it has been assumed that the coarse resolver experiences a complete revolution for 100 inches of translation, that the medium resolver experiences a complete revolution for every 2 inches of translation, and that the fine resolver experiences a complete revolution for every 0.1 of an inch of translation.

In the circuit schematic, the primary winding are energized by a 250 cycle per second signal developed from the output of pulse rate divider 9–PRD. The 250 cycle per second signal appearing on output lead 9–66 is applied to a filter 9–F in order to convert it to a sine wave form. Thereafter, the sine wave signal is applied to the primary windings of the resolvers via leads 9–45 and 9–46. Lead 9–45 is directly applied, whereas lead 9–46 is connected via a 90° phase shifter 9–PS and lead 9–59. The function of the 90° phase shifter is to alter the relationship between the outputs on leads 9–45 and 9–46 to that of sine and cosine signals. It should be recognized that filter means 9–F are of a nature to accurately generate sine wave signals of equal amplitude on both output leads. The accuracy of the resolvers is of course contingent upon the purity of the sine wave inputs and the constancy of the amplitudes of these inputs. Phase shifters and circuits for developing sine waves are well known in the art.

The output of each resolver is applied to a wave shaper 11–13, 11–14, or 11–15, of any type known in the art, wherein it is converted from a sine wave to a square wave. The outputs of the wave shapers are thus phase modulated signals wherein the time of occurrence of a transition from a first to a second state occurs with respect to the 250 cycle reference signal at a time proportional to the actual apparatus position. These phase modulated position signals are compared with the phase-coded command signals in order to determine in which direction, and at what speed, the feed mechanism is to be operated.

*Determining required direction of motion*

In order to position the equipment, a rapid transport speed is used until the apparatus is within close proximity to the desired position. During this initial phase of the positioning operation it is sufficient to merely known the direction in which the apparatus must move to approach the desired position. It is only when the apparatus is within close proximity to the desired position that particular attention must be given to high resolution signals in order to generate accurate signals for controlling the positioning apparatus at speeds commensurate with the degree of position error.

In the instant embodiment, the coarse components of the command and position signals are initially compared in order to determine the direction of feed required. When the difference between the coarse command and coarse position signals is greater than a preselected amount, the feed mechanism is driven at the fast transport speed in the appropriate direction. When the difference, or position error, becomes less than the preselected amount, the feed mechanism is driven under control of medium signal comparison circuits at an intermediate transport speed. Ultimately, the error will be decreased below a smaller preselected amount, at which time the phase of the fine signals is compared to develop analog signals for driving the feed mechanism at a rate commensurate with the degree of error. As previously noted, it may be advantageous to employ this analog comparison for even greater errors. This would also come within the teachings of the invention.

In accordance with the present embodiment, five discrete zones of successively narrower range are established around the commanded position. These zones define an area within a given dimension of the commanded position. For example, the coarse zone has been assumed to define the area within 0.6 of an inch of the commanded position. Three intermediate zones have been established by assuming areas within 0.2 of an inch, 0.8 of an inch, and .03 of an inch. Finally, a fine zone has been established by assuming an area within .002 of an inch. The information for developing the coarse zone, the intermediate zones, and the fine zone is extracted from the coarse, medium, and fine command phase counters, respectively.

The unique circuits and techniques used to establish the aforementioned zone is described in detail in the following sections of the specification. In conjunction with this description, the terminology used will include reference to whether the command signal is "larger" or "smaller" than the position signal. This is a convenient way of denoting in which direction the apparatus must be driven to arrive at the commanded position. If all dimensions are considered as being generated from a zero reference, it will be clear that when a command signal is larger than a position signal the apparatus must be moved farther away from the reference. On the other hand, when the position signal is larger than the command signal, the apparatus must be moved toward the reference.

The equipment used for determining whether the coarse command signal is greater or less than the coarse position signal comprises: a reference flip-flop 11–REF; a coarse-command-set flip-flop 11–CCS; and a coarse-command-larger flip-flop 11–CCL. In the event the actual position is within the coarse zone, i.e., 0.6 of an inch of the commanded position, the determination of which signal is larger is made by consideration of the medium command and position signals. The results of either comparison are translated and/or implemented by gates 11–17 through 11–22 and used to set or reset a command-larger flip-flop 11–CL in accordance with whether the command signal is larger or smaller, respectively, than the position signal.

Determination of whether the coarse command is larger or smaller than the coarse position is accomplished by examining the order in which these two signals appear with respect to a reference. If this reference is the output of 9–PRD, then the stated objective is accomplished. However, in order to allow for the possibility that the position resolver can move to a position slightly negative of zero the reference is taken at what would correspond in phase to a command of 99 inches and as a practical matter, this particular illustrated embodiment would be limited to a machine in which the command or position did not normally exceed the limits of 0 to 98 inches. With this restriction, it is only necessary to determine which of the two signals, coarse command or coarse position, occurs last prior to the 99 inch reference point. If the command signal occurs last, then obviously the position signal occurs first, which would mean that the command is smaller.

A reference of any other dimension can be used. 11–REF could be set at any place, such as 50 inches. This is useful in plus or minus programming as the zero reference might be established near the center of travel and then by programming the 100's complement, a position negative of zero could be commanded. Of course, total travel for this particular system would still be 98 inches but it could be plus or minus 49.

Considering coarse-command-set flip-flop 11–CCS, it will be seen that due to the interconnection of the "1" output and the set steering input, every time a trigger pulse occurs on the set trigger terminal the flip-flop will assume a set condition. The set trigger input is connected directly to the coarse command phase counter output on lead 10–30 and will, therefore, be set upon generation of the coarse command signal. The "0" output of coarse-command-set flip-flop 11–CCS is connected to the reset steering input and, therefore, the flip-flop will be reset in response to trigger impulses on the reset trigger terminal. The reset trigger terminal is connected by lead 11–16 to the coarse position signal output from wave shaper 11–13. Consequently, coarse command set flip-flop 11–CCS is alternately set and reset upon occurrence of the coarse command and coarse position signals, respectively.

The determination of whether the coarse command or the coarse position signal is larger is made by coarse-command-larger flip-flop 11–CCL. The set steering input of 11–CCL is connected to the "1" output of the coarse-command-set flip-flop. The reset steering input of 11–CCL is connected to the "0" output of the coarse-command-set flip-flop. Trigger pulses are applied simultaneously to both trigger inputs of flip-flop 11–CCL at a repetition rate of 250 cycles per second from the "0" output of reference flip-flop 11–REF. Thus, coarse-command-larger flip-flop 11–CCL will assume a set state when the coarse command is larger and a reset state when the position command is larger.

Reference flip-flop 11–REF, as connected in the circuit schematic, is arranged to assume a set state when the pulse rate divider 9–PRD has counted ten reference pulses. This would be identical to a command phase counter with a 99 inch command. It is reset when 500 reference pulses have been counted. This operation is accomplished by connecting the 1000 output on lead 9–51 from decade 9–PRD3 to the set steering input; by connecting the $\overline{1000}$ output on lead 9–61 from decade 9–PRD3 to the reset trigger input; by connecting the 10 output on lead 9–53 from decade 9–PRD1 to the set trigger input, and by interconnecting the "0" output of the reference flip-flop to its own reset steering input.

As a consequence of these connections, upon reset following the completion of a first count of 500, a triggering pulse is applied to the reset trigger and flip-flop 11–REF is reset. Immediately upon the subsequent registration of 1000 in pulse rate divider 9–PRD, the set steering lead of the reference flip-flop is conditioned by a logic 0 signal. After 10 more input pulses, the pulse rate divider generates a logic 0 signal on lead 9–53 which sets flip-flop 11–REF and it remains in this state until the pulse rate divider completes a count of 500. At the instant of setting, the "0" output of flip-flop 11–REF applies a trigger pulse to coarse-command-larger flip-flop 11–CCL and in accordance with whether the command or position signal has arrived last, prior to that time, the coarse-command-larger flip-flop assumes a reset or set state, respectively.

The control over the feed mechanism which determines the direction of apparatus travel is exercised by command-larger flip-flop 11–CL via a digital-to-analog converter 12–10 in FIGURE 12. Gates 11–17 through 11–22 control the state of this flip-flop in accordance with either the state of flip-flop 11–CCL or, if within the coarse zone, in accordance with a comparison of the medium command and position signals. The functioning of these gates in response to particular signals is believed obvious, in view of the previous descriptions of circuit operation and consequently, a detailed tracing of signal conditioning throughout each of the gates will not be pursued. It is sufficient to recognize that when the coarse command signal is larger than the coarse position signal by an amount greater than 0.6 of an inch, gate 11–17 produces a logic 1 output which operates through gate 11–19 to condition the set steering lead of the command-larger flip-flop. Upon the subsequent occurrence of the medium position signal on lead 11–32, command-larger flip-flop 11–CL is triggered to a set state. When the coarse command signal is smaller than the coarse position signal by an amount greater than 0.6 of an inch, gate 11–21 is effective via gate 11–22 to condition the reset steering lead and upon the subsequent occurrence of the medium command signal on lead 10–31, command-larger flip-flop 11–CL is triggered to a reset state.

In the event that the difference between command and position signals is less than 0.6 of an inch, gates 11–18 and 11–20 are the operative factors in the conditioning of the set or reset steering inputs of flip-flop 11–CL. When the medium command signal occurs, gate 11–18 conditions the set steering input and the subsequent application of the medium position signal via lead 11–32 to the set trigger lead will set the command-larger flip-flop. On the other hand, should the medium position signal occur first, gate 11–20 will condition the reset steering input and the subsequent occurrence of the medium command signal on lead 10–31 will reset the command-larger flip-flop.

The state of command-larger flip-flop 11–CL is transmitted via leads 11–23 and 11–24 connected to the "1" and "0" outputs, respectively, to digital-to-analog converter 12–10. A signal is generated at the output of the converter on lead 12–11 which is conditioned by operational amplifier 12–12 and applied to drive the X axis feed motor control 12–13. As long as this signal appears, the X axis feed motor control will be driven at a fast transport speed. However, as the apparatus is driven into closer proximity with the commanded position, additional signals are generated which ultimately cut off the digital-to-analog converter 12–10 leaving only converter 12–14 to supply a signal, and when within a still smaller zone converter 12–14 will generate control signals proportional to the degree of position error.

*Coarse zone positioning control*

The employment of successively narrower zones to accurately control positioning has been described hereinbefore. The specific means used for developing these zones will now be considered.

In the upper right portion of FIGURE 11, coarse-zone flip-flop 11–CZ and in-coarse-zone flip-flop 11–ICZ are illustrated. The coarse zone flip-flop is set during the period that the number registered in the coarse command phase counter indicates a position within 0.6 of an inch of the commanded position. If the coarse position signal should occur during this interval, in-coarse-zone flip-flop 11–ICZ will be set.

The coarse-zone flip-flop 11–CZ has its input terminals conditioned under the control of selected stages of the coarse command phase counter. These stages establish the condition that the coarse-command phase counter registers a count equivalent to a position between 99.4 inches (i.e., minus 0.6 of an inch) and 0.6 of an inch of the commanded position. Flip-flop 11–CZ is set when the coarse-command phase counter registers 99.4 and reset when it registers 0.6 of an inch.

In order to set the command coarse zone flip-flop at the instant 99.4 inches are registered in the coarse command phase counter, the set steering lead is conditioned when the command phase counter registers a count of 99. Upon subsequent registration of 0.4 in the third decade 10–13, a trigger pulse is applied to the set trigger input in order to set the flip-flop. Similarly, the reset steering input is conditioned upon registration of a count of 0.4 and a reset trigger signal is applied upon subsequent registration of 0.2 in the third decade 10–13. The particular leads and gates employed for the control of coarse-zone flip-flop 11–CZ are connected as shown. For convenience in tracing these leads, decimal notations indicative of the outputs of particular stages accompany the lead designations. A gate 11–23 and inverter 11–25 are employed to interconnect the appropriate stages of the coarse command phase counter to the set steering input flip-flop 11–CZ. A gate 11–24 having inputs indicative of a 0.4 registration is connected via inverter 11–26 to the reset steering input.

The "1" output and "0" output of flip-flop 11–CZ are connected to the reset steering and set steering inputs respectively, of flip-flop 11–ICZ. Thus, receipt of a trigger impulse by flip-flop 11–ICZ within the 0.6 of an inch zone, will set the flip-flop; otherwise, it will be reset. The trigger impulse is obtained directly from the coarse wave shaper 11–13 over lead 11–27 and, therefore, in the event the coarse position signal is within the zone, the in-coarse-zone flip-flop will be set. The effect of this setting upon the control over command-larger flip-flop 11–CL was considered hereinbefore in conjunction with the conditioning of gates 11–17 through 11–22. It should also be noted that when flip-flop 11–ICZ is reset, indicating that the position is not in the 0.6 of an inch zone, the logic 1 on its "0" output will hold 11–IMZ1 in a reset state and will inhibit the steering to the set sides of 11–MZ2 and 11–MZ3 resulting in 11–IMZ2 and 11–IMZ3 being held in a reset state.

*Intermediate zone positioning control*

Three intermediate positioning zones are established in this illustrative embodiment. These zones are created by medium zone flip-flop 11–MZ1, 11–MZ2, and 11–MZ3 under the control of the medium command phase counter. In essence, each of these zones is generated in the same manner that the coarse zone was generated. They differ specifically, in that the medium command phase counter is used as the controlling factor in order to use the increased resolution available from the information registered therein. Inasmuch as the circuitry illustrates the components and interconnection for generating these zones, the particular leads will not be traced. Nevertheless, the outputs of the associated in-zone flip-flops will be considered.

When the apparatus is within the first medium zone, i.e., within 0.2 of an inch of the commanded position, a signal is generated on lead 11–28 which is applied to digital-to-analog converter 12–10. In response to this signal, a control signal is generated which causes driving of X-axis feed motor control 12–13 at an intermediate transport speed.

FIGURE 17 shows apparatus control voltage or current as a function of the position error. Of course, from a control standpoint, the voltage-current axis may also be considered to represent the translation velocity of the feed mechanism. As illustrated in FIGURE 17, when the actual position is within 0.2 of an inch of the commanded position, the applied control signal is of constant amplitude and of smaller magnitude than that applied previously. In actual operation the proportional region slope may be varied with a gain control to achieve high gain within the limits of stable operation. This affects the first "plateau" which bears a fixed relation to it. It does not raise the maximum or second level (that beyond 0.2 of an inch) because this is established for the maximum speed of the apparatus. For a high gain setting, the proportional portion of the curve might reach this maximum level.

In response to the lower magnitude control signal the apparatus moves until it is within the second intermediate zone and this is detected by in-medium-zone flip-flop 11–IMZ2. At this time, the apparatus position is withing 0.08 of an inch of the desired position and the logic 1 appearing on the "1" output of flip-flop 11–IMZ2 calls in a phase discriminator to develop an analog current that is proportional to the phase difference between the fine position signals and the fine command signals.

*Phase discriminator positioning*

The phase discriminator comprises a command flip-flop 12–C, a position flip-flop 12–P, a reset flip-flop 12–R, and a digital-to-analog converter 12–14. The digital-to-analog converter 12–10 has three inputs. The center input must be a logic 0 to enable either of the other inputs. If one of the other inputs is supplied with a logic 0 signal it will produce a positive current. If the other outside input is supplied with a logic 0 it will produce a negative current. Thus, if all inputs are at logic 0, the net output current will be zero. Any convenient circuit for implementing this operation is acceptable. Command flip-flop 12–C and position flip-flop 12–P supply a logic 0 over leads 12–17 and 12–18 respectively, when set. Therefore, the setting of these flip-flops defines the operating period of digital-to-analog converter 12–14.

The setting of the command and position flip-flops is determined by fine signal components if the position error is less than 0.08 of an inch and is determined by the state of the command-larger flip-flop 11–CL if the position error is greater than 0.08 of an inch. These conditions are imposed by means of gates 12–15 and 12–16 connected to the set steering inputs of flip-flops 12–C and 12–P, respectively.

Gates 12–15 and 12–16 have a common input from the "1" output of in-medium-zone flip-flop 11–IMZ2. This input on lead 11–29 applies a logic 0 to the inputs of the gates at all times that the position error is greater than 0.08 of an inch. During this period signals are applied via leads 11–23 and 11–24 to the second input terminals of gates 12–15 and 12–16, respectively. As described hereinbefore, lead 11–23 has a logic 1 thereon when the command signal is larger than the position signal and lead 11–24 has a logic 1 thereon when the position signal is larger than the command signal. Thus, gates 12–15 and 12–16 condition the set steering input of the appropriate flip-flop in accordance with which signal is larger. The subsequent occurrence of a triggering pulse on the set trigger input of the flip-flop will cause it to be set and thereby to apply a logic 0 signal to the digital-to-analog converter 12–14. The set trigger input for command flip-flop 12–C is the output of the fine command phase counter, available via lead 10–27. Similarly, the set trigger input of the position flip-flop 12–P is the fine position signal which appears on lead 12–26 connected via lead 11–41 to the output of wave shaper 11–15.

When within 0.08 of an inch of the commanded position a logic 1 is applied via lead 11–29 to gates 12–15 and 12–16 which conditions the set steering leads and insures the setting of both flip-flops 12–C and 12–P upon arrival of subsequent set triggering pulses.

Obviously the phase discriminator must be recycled for each cycle of operation and the command and position flip-flops must be returned to their reset states. There are three means of recycling. The normal method is to reset both 12–C and 12–P when the second of the two flip-flops set. However, if when the positioning cycle starts the first one that happened to set were the wrong one, a false error measurement would result. For example, a negative error of .070 of an inch might be indicated when the true error is a positive error of .030 of an inch. The other two means of resetting guard against this. If the error is greater than .030 of an inch, then the medium signals are capable of resolving whether command or position is larger and the connections are such that the one of these signals which will necessarily be the proper one to be second, will cause a reset. Thus, if this signal happened to be first at the start of an operation, it would still give a reset and then the flip-flops would set and reset in proper order.

As the error gets very small, the medium signals do not have sufficient accuracy to determine properly whether command is larger and the third means of resetting can be used to guard against an incorrect sequence. Knowing that the error is less than .030 of an inch, for correct operation there will be neither 12–C nor 12–P set at a time 500 counts after the command signal so a reset signal is generated at this time and in case of a false sequence the improperly set flip-flop would be reset and thereafter in that positioning cycle the proper sequence would occur. When the positioning starts from an error greater than .080 of an inch, the proper sequence of operation of 12–P and 12–C will automatically occur as the .080 of an inch zone is entered. It is only when the positioning cycle starts within .080 of an inch, but greater than .030 of an inch, that the first of these additional means is needed or when less than .030 of an inch that the last is needed. However, when between .030 and .080 of an inch, the first means operates anyway so there are actually two sources of a reset signal. When the position error is greater than 0.03 of an inch, this recycling is under the control of the command-large flip-flop 11–CL. When the position error is less than 0.03 of an inch, resetting of the command or position flip-flops occurs when decade 10–14 of the fine command phase counter registers 0.05, or when both flip-flops 12–C and 12–P have been set.

Normally, within the 0.08 of an inch zone, the concurrent set condition of both command flip-flop 12–C and position flip-flop 12–P provides logic 0 signals which are effective via gates 12–24 and 12–25 to condition the set steering input of reset flip-flop 12–R and this in turn also results in resetting of the command and position flip-flops.

The second resetting technique, operative when the error is greater than 0.03 of an inch, uses the medium signals to determine whether the command or position is larger. Logic gates 12–19 through 12–22 and 12–27 implement this comparison and the set steering input of flip-flop 12–R is conditioned by the output of gate 12–27.

Reset flip-flop 12–R is triggered via lead 9–58 by pulses from pulse rate divider 9–PRD at a repetition rate of 125 kilocycles per second. Immediately following the conditioning of the set steering input, the next trigger pulse sets reset flip-flop 12–R and the logic 0 appearing at the "0" output thereof is applied to condition the reset steering inputs of both command flip-flop 12–C and position flip-flop 12–P. The subsequently occurring trigger pulses on the reset trigger inputs of the latter mentioned flip-flops are effective to reset them. This removes the logic 0 signal which has been applied by the respective flip-flops to the digital-to-analog converter 12–14. A subsequently appearing trigger input resets 12–R.

The third resetting arrangement is effective when the equipment is positioned within .03 of an inch of the commanded position. In this case, the command and position flip-flops are reset by means including gate 12–23. Inputs to this gate include the appropriate leads from the fine command phase counter and from the "0" output of in-medium-zone flip-flop 11–IMZ3 over lead 11–30. Due to these inputs, gate 12–23 generates a logic 1 at the output thereof whenever the error is with .03 of an inch and the fine phase counter registers a count of .05. This logic 1 signal is applied via gate 12–27 to condition the set steering input of reset flip-flop 12–R and the subsequently appearing trigger pulse is effective to set flip-flop 12–R and thereafter to reset command and position flip-flops 12–C and 12–P.

In recapitulation, it will be seen that during the time that the position error is within 0.08 of an inch, the phase discriminator enables digital-to-analog converter 12–14 for the interval of time determined by the actual phase difference between the fine command and fine position signals. This is done every cycle. Under the influence of the analog signal generated at the output of digital-to-analog converter 12–14 operational amplifier 12–12 drives the X axis speed motor control mechanism into closer and closer proximity to the commanded position.

In order to insure termination of operation when the apparatus has arrived at the commanded position, an additional zone is established within which the drive equipment is disabled. When the position error is within 0.002 of an inch, an error monitor relay 12–EM is de-energized after a short time delay and power is removed from the drive mechanism. This final precise positioning zone is set up under the control of the fine command phase counter and appears in the upper left corner of FIGURE 12.

*Final positioning*

The establishment of a 0.002 of an inch zone by means of fine zone flip-flop 12–FZ is accomplished in the same manner as the establishment of the zones heretofore considered. As will be seen in the circuit diagram, a gate 12–28 supplies a logic 1 output when the position error is within 0.03 of an inch and the number 0.09 is registered in the fine command phase counter. This logic 1 signal operates via inverter 12–19 to condition the set steering input of fine zone flip-flop 12–FZ. Upon the subsequent occurrence of a trigger pulse from decade 10–15 of the fine command phase counter when it registers a count of 0.008, the flip-flop is set. Thus, the setting occurs when the fine command phase counter registers 0.098.

The "0" output terminal of flip-flop 12–FZ is interconnected with the reset steering input terminal and the reset trigger terminal is interconnected with the 0.002 stage decade 10–15 of the fine command position counter. Consequently, flip-flop 12–FZ is reset when the command phase counter registers 0.002. Accordingly, the zone defined by the flip-flop is ±0.002 of an inch from the commanded postion. The "1" and "0" outputs of flip-flop 12–FZ are connected to the reset steering and set steering inputs respectively of in-fine-zone flip-flop 12–IFZ. The trigger inputs of this flip-flop are tied together and connected to lead 11–41 which carries the fine position signals from wave shaper 11–15. Upon occurrence of a fine position signal within the 0.002 of an inch zone, flip-flop 12–IFZ is set.

Upon setting, the in-fine-zone flip-flop 12–IFZ is effective to de-energize normally energized relay 12–EM, thereby indicating that the equipment is in position. This de-energization is accomplished by means of gate 12–30 and amplifier 12–31. Gate 12–30 is conditioned by a logic 0 when the end-of-block signal is produced by flip-flop 9–EOB. During the time that position flip-flop 12–IFZ is in a reset state, a logic 0 is applied to the other terminal of gate 12–30 and consequently, the logic 1 at the output thereof is effective via inverting amplifier 12–31 to hold the error monitor relay 12–EM activated. Upon setting of in-fine-zone flip-flop 12–IFZ, the logic 1 appearing on the "1" output terminal thereof is transmitted through gate 12–30 and inverted by amplifier 12–31 to decrease the voltage applied to relay 12–EM and cause it to release. Because it is desirable to position closer than ±.002 of an inch, a time delay de-energization of the relay is accomplished by a well-known technique. A resistor and capacitor are serially connected across the winding of relay 12–EM. Thus, the fine zone may be selected sufficiently large that the apparatus will always be able to position within the zone, even in a case of exceptionally high friction load, and yet provision is made to allow the apparatus to position more accurately than the limits of the zone before terminating the positioning cycle. This release voltage is used in any conventional fashion to stop tthe positioning mechanism.

In FIGURE 13, it will be noted that in-position relay 13–IP will assume an energized condition when error relay 12–EM operates. This is true because at this time the reading-complete relay 13–RC has dropped out, the ready-to-read relay 13–RTR is not energized, and because it is assumed that the Y-position has also been achieved.

The foregoing discussion has been directed toward explaining the complete operation of the position control circuitry in an automatic mode. With this mode of operation, the equipment is initially started and thereafter all operations are under the control of data presented by the input equipment. There are also times when it is desirable to utilize the automatic attributes of this system without employing input data equipment. This mode of operation has been called the "semi-automatic" mode. In general, it differs from the automatic mode of operation in that the pulse rate divider 9–PRD is used to generate the required control signals in place of the sequence control signals from sequence circuit 8–34 which is responsive to the tape input equipment. Also, the zero reference data is used as the sole input data to the system. The differences in semi-automatic operation are confined to the read-in of data into the command phase counter section. These differences will now be considered.

*Semi-automatic operation*

As shown in FIGURE 13, when semi-automatic operation is selected, pushing the cycle start switch is effective to energize the zero-offset-only relay 13–ZO0. This relay, when energized, places the zero-offset flip-flop 9–ZO1, appearing at the left-center of FIGURE 9, in a set condition. When the switch is released, 9–ZO1 is placed in a reset condition by the application of a logic 1 to the reset terminal thereof. Upon reset, flip-flop 9–ZO1 applies a logic 0 signal to the set trigger input of the second zero offset flip-flop 9–ZO2. When semi-automatic operation is selected, the set steering input of flip-flop 9–ZO2 has a logic 0 thereon and, therefore, assumes a set state in response to the trigger input.

The conditioning of the set steering input of zero offset flip-flop 9–ZO2 is accomplished by end-of-block flip-flop 9–EOB, which will be in a reset state. If 9–EOB were to be in a set state prior to pressing the cycle start switch, it would be reset due to the configuration of contacts appearing on the reset steering input. During the transition period while these relays are operating following the pressing of the cycle start switch, there will be a period when all contacts in the configuration will be opened. This will place a logic 0 on the reset steering input of 9–EOB for a period well in excess of that between two pulses in the signal appearing on the reset trigger input. The logic 0 on the "1" output of flip-flop 9–EOB is directly applied to condition the set steering input of flip-flop 9–ZO2.

After being set, flip-flop 9–ZO2 starts the semi-automatic sequence timing signals shown in the timing diagram of FIGURE 19. These timing signals are derived by using the logic 0 on the "0" output of flip-flop 9–ZO2 as an enabling gate pulse for passing particular outputs from pulse rate divider 9–PRD to appropriate circuits. Thus, the logic 0 generated upon lead 9–48 is applied to gates 9–49 and 9–50 to enable subsequently occurring pulses from the "20" and "40" stages of decade 9–PRD2 of the pulse rate divider to be passed therethrough and furnish $\overline{\text{commad reset}}$ and $\overline{\text{preset zero offset}}$ signals on on leads 9–10 and 9–18, respectively.

As shown in FIGURE 19, after the setting of flip-flop 9–ZO2, the command reset signal on conductor 9–10 is generated by a logic 0 from the "0" of the second stage of the second decade 9–PRD2. Thereafter, the preset zero offset signal is generated on line 9–18 by a logic 0 from the "0" side of the fourth stage of the second decade 9–PRD2. More than one set of signals can occur as shown in FIGURE 19 but this will not change the end result. A change to logic 0 on lead 9–64 will set flip-flop 9–EOB and at the time of the next change on lead 9–64 to a logic 1, a change to logic 0 on the connection from the fourth stage of 9–PRD2 to the reset trigger of 9–ZO2 will reset 9–ZO2, returning lead 9–48 to a logic 1 and preventing additional generation of command reset and preset zero offset signals. Simultaneously with the preset zero offset signal, a $\overline{\text{preset medium counter}}$ signal is generated on lead 9–28 and the data contained in the coarse and fine command phase counters is transferred into the medium counter in accordance with the selective connections therebetween.

Subsequently, upon a count of 1000 in 9–PRD, command count flip-flop 9–CC and command count trigger flip-flop 9–CCT are set just as for the automatic mode of operation. From this time on, operation of the equipment is similar to that already considered in the case of the automatic operating mode.

A position control system has been described wherein multi-range command signals are compared with multi-range position signals to develop apparatus positioning signals. In particular, a number of zones are established about each commanded position and as the equipment brings the apparatus within these zones, preselected driving signals are applied to the drive mechanism. The zones are developed by selective use of the numbers registered in the various command phase counters used to generate the coarse, medium, and fine components of the command signal.

While the above described circuit constitutes a particular embodiment of the invention, it will, of course, be understood that it is not wished to be limited thereto since modifications can be made both in the circuit arrangement and in the instrumentalities employed. It is contemplated in the appended claims to cover any such modifications as fall within the true spirit and scope of the invention.

What is claimed as new and desired to be secured by Letters Patent of the United States is:

1. In an object positioning system wherein a commanded position of said object is represented by a phase-coded command signal and the actual position of said object is represented by a phase-coded position signal, means for ascertaining the presence of said object within a preselected distance from said commanded position comprising, a first bistable element normally residing in a first state and operative to assume a second state within a preselected time interval before and after occurrence of said command signal, and a second bistable element controlled by said first bistable element and responsive to said position signal to assume a first or second state in accordance with the condition of said first bistable element.

2. In an object positioning system wherein a commanded position of said object is represented by numerical data and the actual position of said object is represented by a phase-coded position signal, means for detecting the presence of said object within a zone including said commanded position comprising, means responsive to said numerical data to generate a phase-coded command signal representing said commanded position and also to generate zone signals representing preselected distances on either side of said commanded position, a first bistable element normally residing in a first state and operative in response to said zone signals to assume a second state during the interval therebetween, and a second bistable element controlled by said first bistable element and responsive to said position signal to assume a first or second state in accordance with the condition of said first bistable element.

3. In an object positioning system wherein a commanded position of said object is represented by numerical data and the actual position of said object is represented by a phase-coded position signal, means for detecting the presence of said object within a zone including said commanded position comprising, a reference signal source, a signal generator operative in response to said reference signal and said numerical data to generate a phase-coded command signal representing said commanded position, means controlled by said signal generator operative to produce a first and second zone signal at preselected intervals of time before and after occurrence of said phase-coded command signal, a first bistable element normally residing in a first state and operative in response to said zone signals to assume a second state during the interval therebetween, and a second bistable element controlled by said first bistable element and responsive to said position signal to assume a first or second state in accordance with the condition of said first bistable element.

4. In an object positioning system wherein a commanded position of said object is represented by numerical data and the actual position of said object is represented by a phase-coded position signal, means for detecting the presence of said object within a zone including said commanded position comprising, a reference signal source, a command phase counter preset by said numerical data and operative to increase the number registered therein in response to said reference signal and to recycle upon registration of a preselected number, means controlled by said command phase counter upon recycling to produce a phase-coded command signal representing said command position, means operative upon registration of preselected numbers before and after said recycling to generate zone signals, a first bistable element normally residing in a first state and operative in response to said zone signals to assume a second state during the interval therebetween, and a second bistable element controlled by said first bistable element and responsive to said position signal to assume a first or second state in accordance with the condition of said first bistable element.

5. In an object positioning system wherein a commanded position of said object is represented by a plurality of numerical terms having successively finer resolution, a reference signal source, a first signal generator operative in accordance with a particular one of said numerical terms to generate a command signal having a phase relationship with said reference signal representative of said one term, a second signal generator operative in response to the actual position of said object to generate a position signal having a phase relationship with said reference signal representing the position of said object with a resolution equivalent to that of said one term, means controlled by said first signal generator operative to produce a first and second zone signal at preselected intervals of time before and after occurrence of said command signal, a first bistable element normally residing in a first state and operative in response to said zone signals to assume a second state during the interval therebetween, and a second bistable element controlled by said first bistable element and responsive to said position signal to assume a first or second state in accordance with the condition of said first bistable element.

6. In an object positioning system wherein a commanded position of said object is represented by a plurality of numerical terms having successively finer resolution, a reference signal source, a plurality of command signal generators each operative in accordance with a different one of said numerical terms to generate a command signal having a phase relationship with said reference signal representing said one term, a plurality of position signal generators each operative in response to the actual position of said object to generate a position signal having a phase relationship with said reference signal representing said actual position with a resolution equivalent to that of one of said terms, individual gating means controlled by each of said command signal generators for generating zone signals representing zones of preselected widths surrounding said commanded position, and bistable means controlled by each of said gating means and normally residing in a first state, said bistable means being responsive to particular position signals to assume a second state when said particular position signals are within the zone defined by said zone signals.

7. In an object positioning system wherein a commanded position of said object is represented by a plurality of numerical terms having successively finer resolution, a reference signal source, a plurality of signal generators each operative in response to the actual position of said object to generate a position signal having a phase relationship with said reference signal representing the position of said object with a resolution equivalent to that of one of said numerical terms, a plurality of command phase counters each preset by one of said terms and operative to increase the number registered therein in response to said reference signal and to recycle upon registration of a preselected number, means controlled by each of said command phase counters upon recycling to produce phase-coded command signals representing said commanded position, the resolution of said phase-coded command signals being equivalent to that of the numerical term preset in the controlling counter, means individual to each command phase counter and operative upon registration of preselected numbers to generate zone signals before and after the recycling thereof, a first plurality of bistable elements normally residing in a first state and each being operative in response to the zone signals from particular command phase counters to assume a second state during the interval therebetween, and a second plurality of bistable elements each controlled by one of said first bistable elements and responsive to selected position signals to assume a state determined by the condition of the controlling bistable element.

References Cited by the Examiner
UNITED STATES PATENTS 2,866,506    10/1958    Hierath et al. _____ 235—151.11
3,098,995    7/1963    Mundt _____ 235—151.11

MALCOLM A. MORRISON, *Primary Examiner.*

K. W. DOBYNS, *Assistant Examiner.*